United States Patent
Yamazaki

(10) Patent No.: US 9,733,462 B2
(45) Date of Patent: Aug. 15, 2017

(54) SCANNING APPARATUS, CONFOCAL OBSERVATION APPARATUS AND DISK SCANNING APPARATUS

(71) Applicant: OLYMPUS CORPORATION, Shibuya-ku, Tokyo (JP)

(72) Inventor: Kentaro Yamazaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/968,498

(22) Filed: Dec. 14, 2015

(65) Prior Publication Data

US 2016/0178880 A1    Jun. 23, 2016

(30) Foreign Application Priority Data

Dec. 17, 2014 (JP) ................................. 2014-255636
Oct. 2, 2015 (JP) ................................. 2015-196382

(51) Int. Cl.
*G02B 26/08* (2006.01)
*G02B 21/00* (2006.01)

(52) U.S. Cl.
CPC ..... *G02B 21/0048* (2013.01); *G02B 21/0032* (2013.01); *G02B 21/0044* (2013.01); *G02B 26/0833* (2013.01)

(58) Field of Classification Search
CPC ............ G02B 21/0044; G02B 21/0048; G02B 21/0032; G02B 26/0833; G01N 21/6458
USPC ...................................................... 359/201.2
See application file for complete search history.

(56) References Cited

U.S. PATENT DOCUMENTS

| | | | |
|---|---|---|---|
| 2008/0218849 A1 | 9/2008 | Uhl et al. | |
| 2009/0279159 A1 | 11/2009 | Uhl et al. | |
| 2013/0335818 A1* | 12/2013 | Knebel | G01N 21/6458 359/385 |
| 2015/0301322 A1* | 10/2015 | Stange | G02B 21/0032 359/389 |

FOREIGN PATENT DOCUMENTS

| | | |
|---|---|---|
| DE | 102007009551 B3 | 8/2008 |
| EP | 2733514 A1 | 5/2014 |
| JP | 04330412 A | 11/1992 |
| JP | 2013015681 A | 1/2013 |

OTHER PUBLICATIONS

Extended European Search Report dated Apr. 22, 2016, issued in counterpart European Application No. 15199858.0.

* cited by examiner

*Primary Examiner* — Euncha Cherry
(74) *Attorney, Agent, or Firm* — Holtz, Holtz & Volek PC

(57) ABSTRACT

A scanning apparatus includes a light source, a spatial light modulator that modulates an incident beam of light on a first reflection surface, an illumination lens that irradiates the spatial light modulator with a beam of light from the light source and that refracts a principal ray of a beam of light modulated by the spatial light modulator so that an angle between the principal ray and an optical axis of the illumination lens decreases, and a first reflector that directs, toward the illumination lens, a beam of light by reflecting the beam of light multiple times between the illumination lens and a front focal plane of the illumination lens, the beam of light being modulated by the spatial light modulator and entering through the illumination lens.

16 Claims, 25 Drawing Sheets

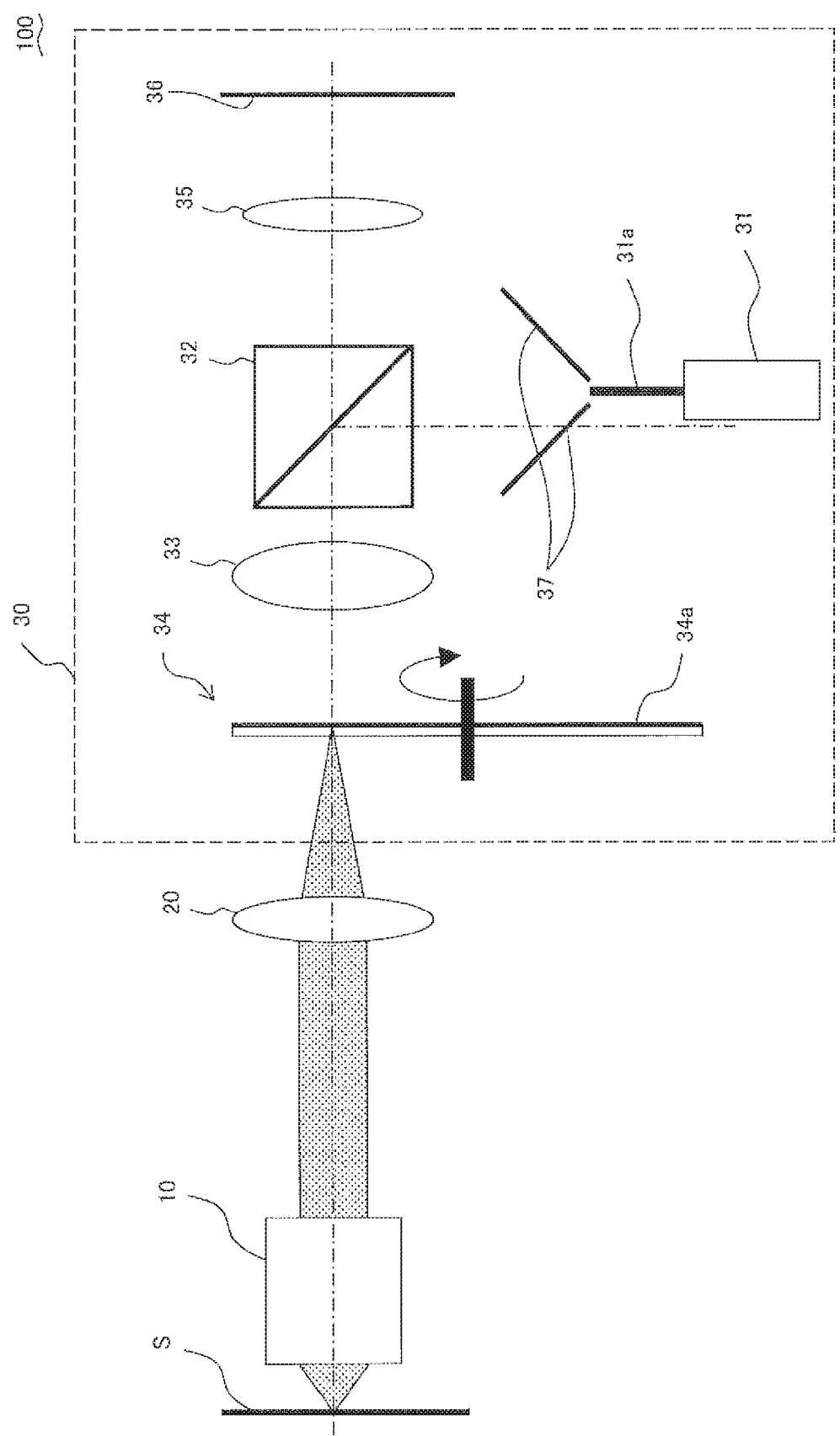
F I G. 1

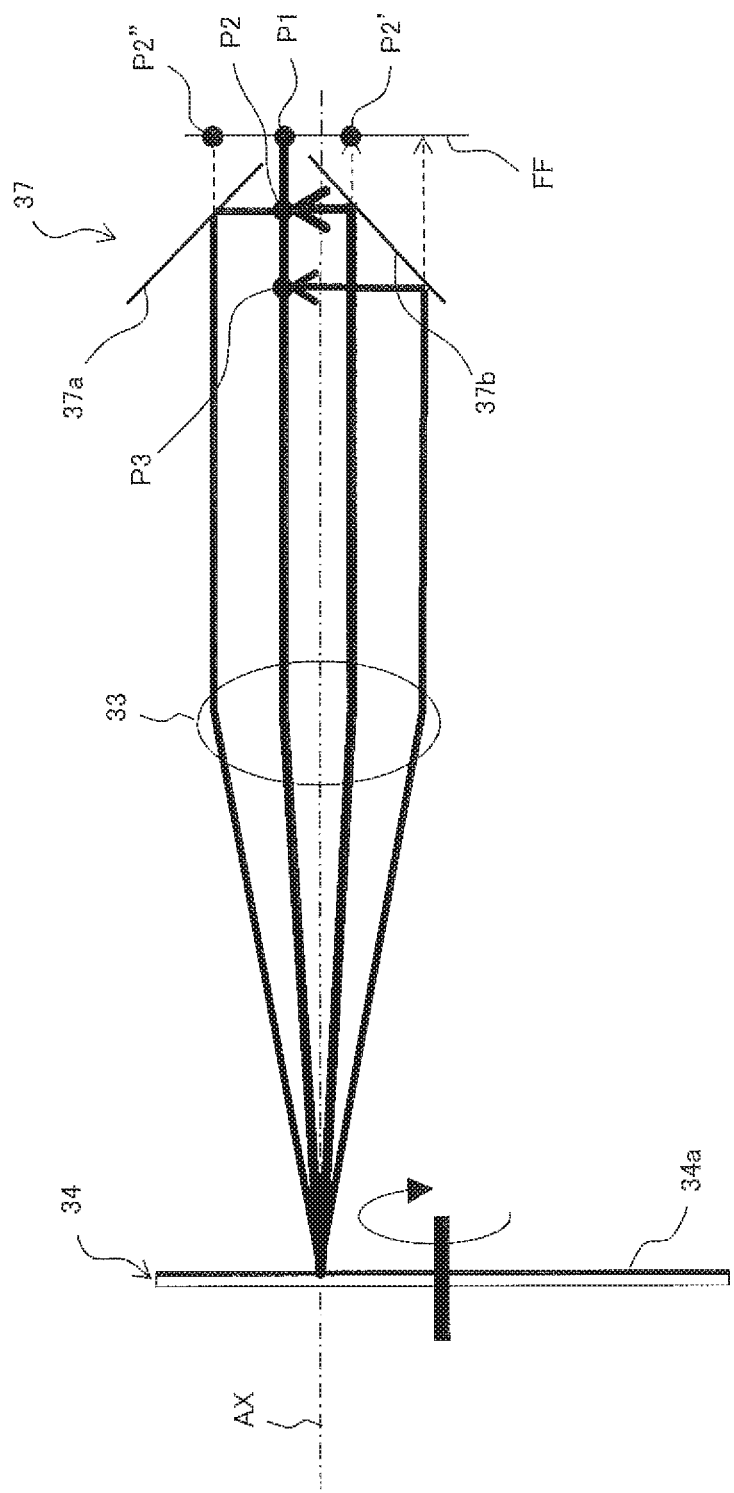
F I G. 4

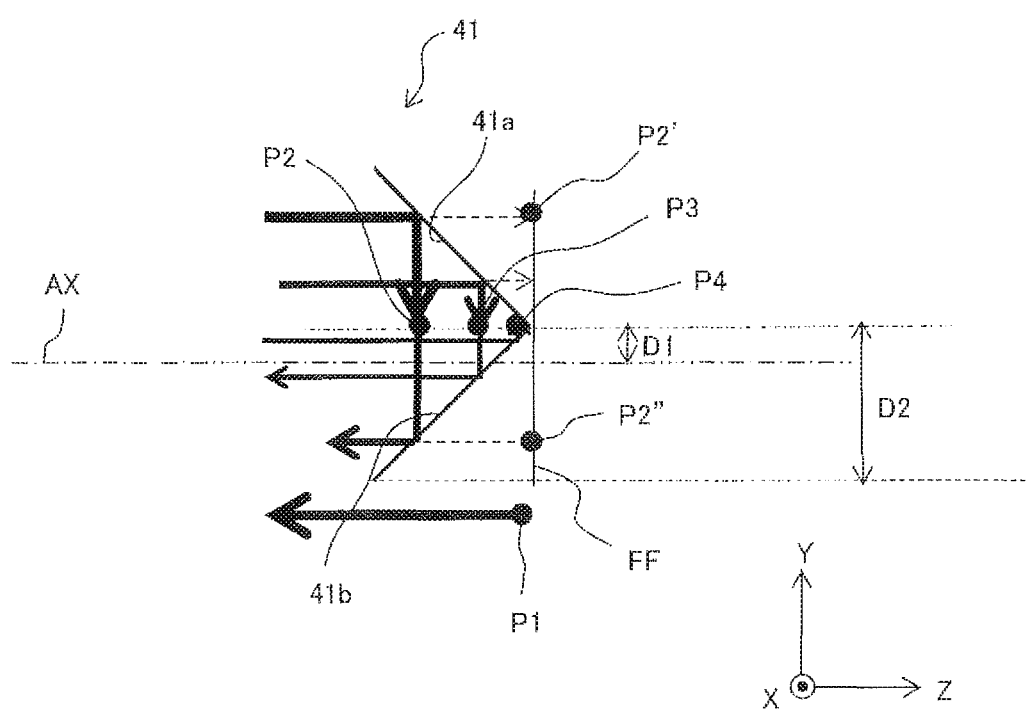
F I G. 9

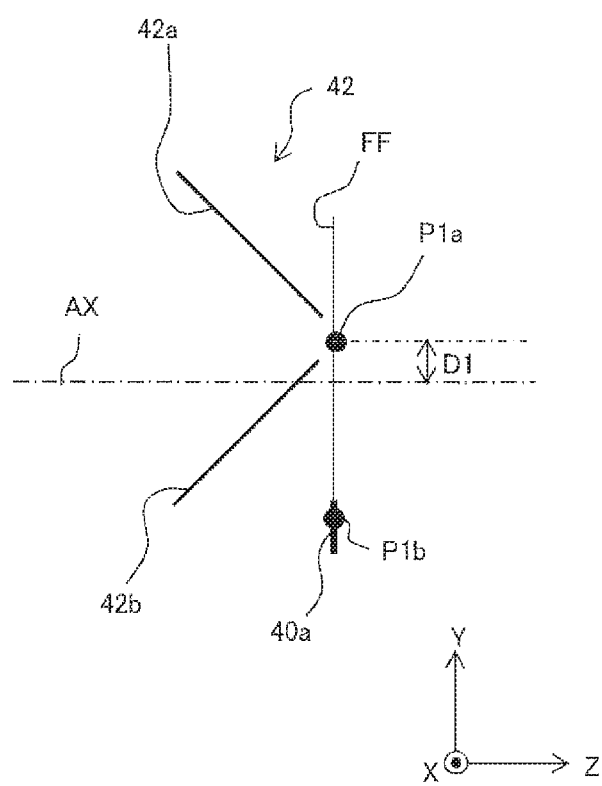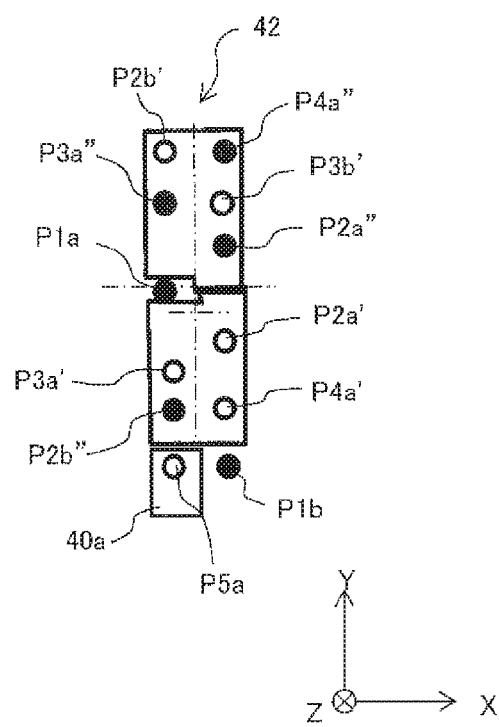
F I G. 1 2 A   F I G. 1 2 B

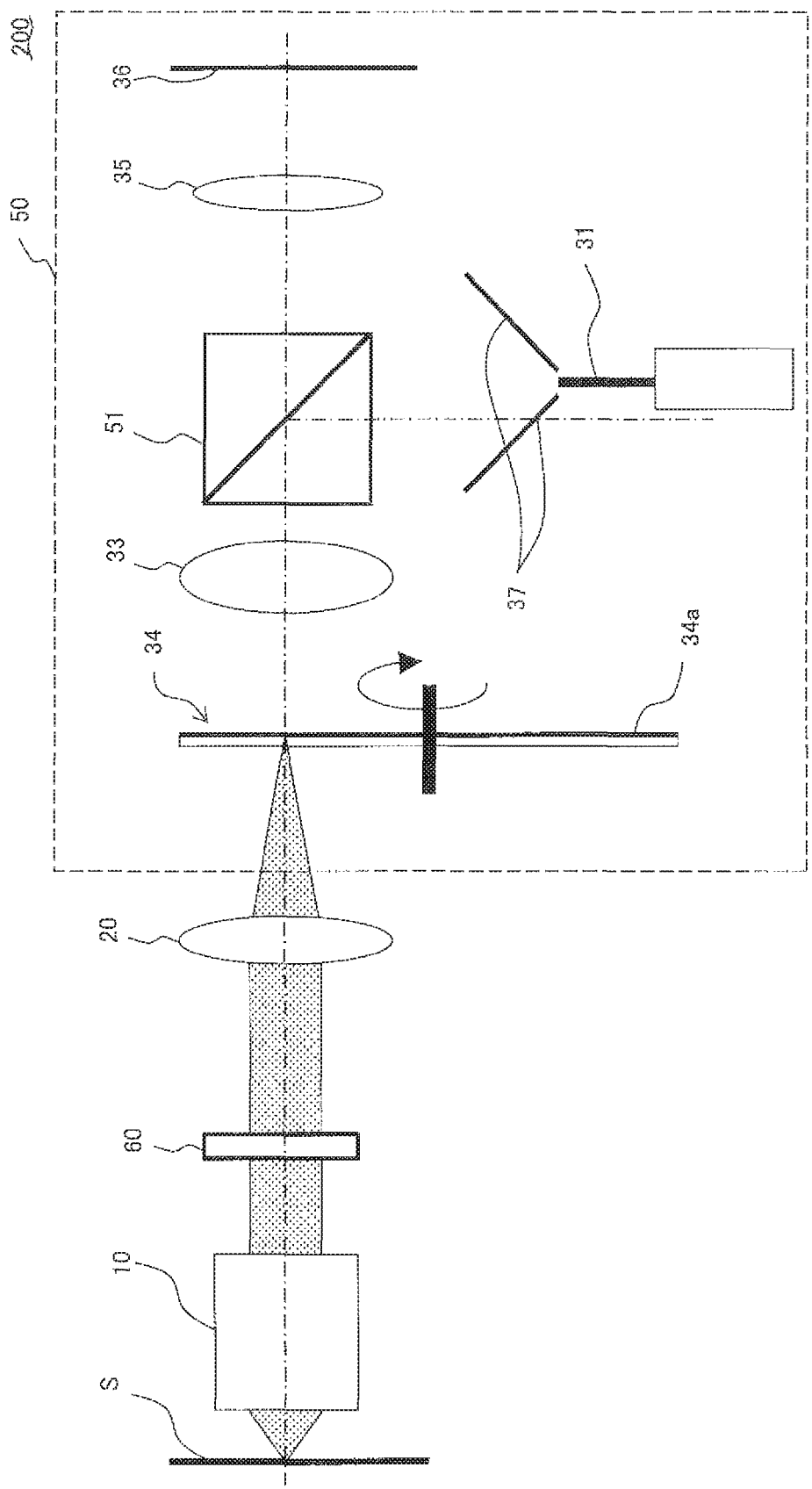
F I G. 17

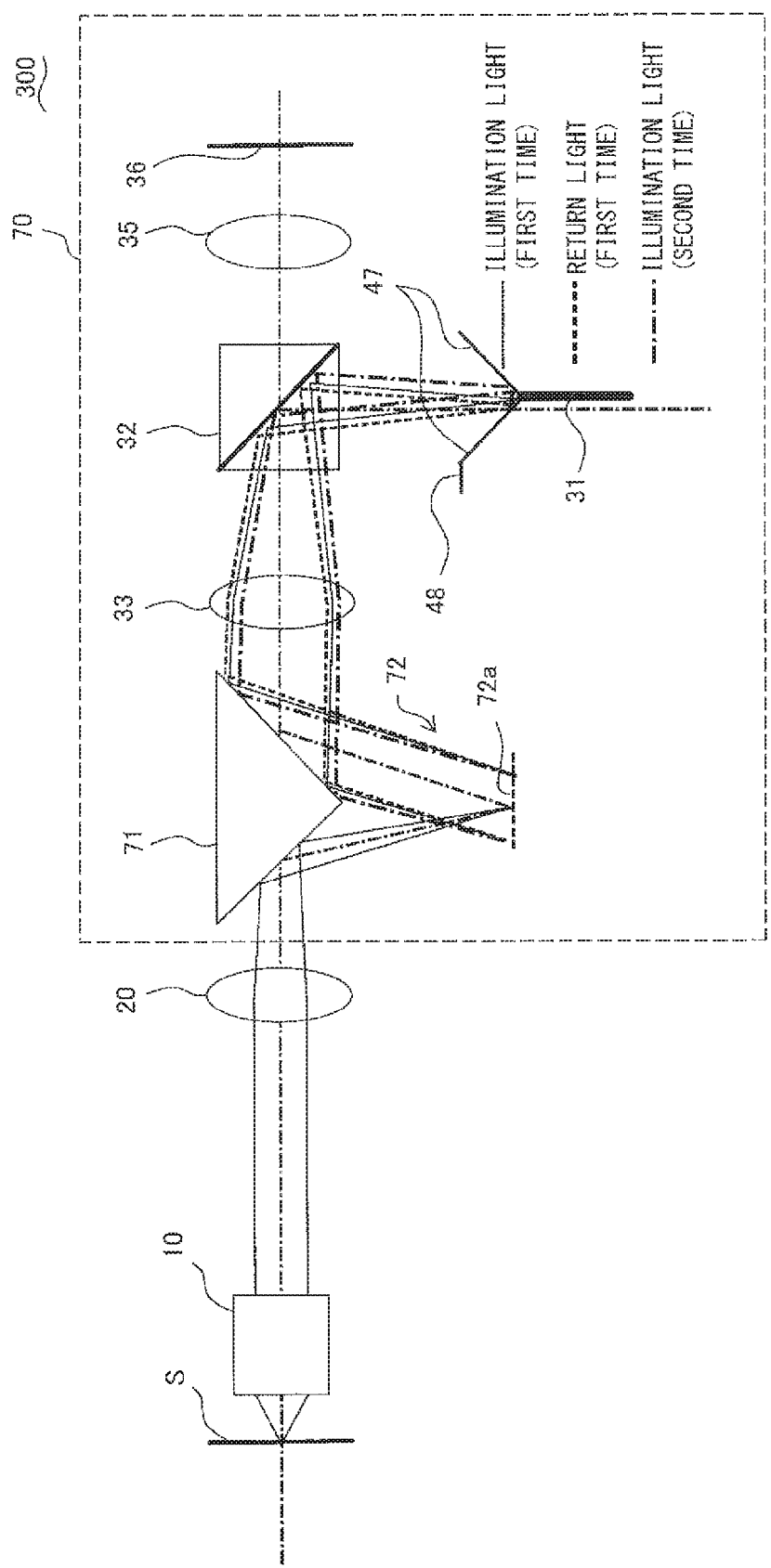
F I G. 23

SCANNING APPARATUS, CONFOCAL OBSERVATION APPARATUS AND DISK SCANNING APPARATUS

CROSS REFERENCE TO RELATED APPLICATIONS

This application is based upon and claims the benefit of priority from prior Japanese Patent Applications No. 2014-255636, filed Dec. 17, 2014 and No. 2015-196382, filed Oct. 2, 2015, the entire contents of which are incorporated herein by this reference.

BACKGROUND OF THE INVENTION

Field of the Invention

This invention relates to a scanning apparatus that scans a sample, a confocal observation apparatus that includes the scanning apparatus, and a disk scanning apparatus.

Description of the Related Art

Confocal observation apparatuses such as a confocal microscope are widely used in various fields such as a testing of a semiconductor substrate and an observation of a biological sample because they have a high resolution in a Z-axis direction and provide an excellent sectioning effect.

A confocal microscope detects light from each point on a sample such as a substrate or a biological sample by scanning the sample, so as to obtain an image of the sample. For that reason, it includes a scanning apparatus that scans the sample. There are various types of scanning apparatuses for a confocal microscope, and a scanning apparatus that scans a sample by modulating light in a plane optically conjugate with the sample is known. This type of scanning apparatus includes a scanner that uses a micro electromechanical systems (MEMS) device such as a digital micromirror device (DMD) or uses a liquid crystal device, and a scanning apparatus that includes a spinning disk in which, for example, slits or pinholes are formed (hereinafter referred to as "disk scanning apparatus") is a typical example of it.

Generally, using a disk scanning apparatus, multipoint scanning can be performed and there are fewer mechanical restrictions on a high-speed rotation of a disk. Thus, in principle, a sample can be scanned at high speed. However, in the disk scanning apparatus, a majority of incident illumination light is interrupted and wasted by the disk. As a result, an exposure time is increased in order to compensate its low illumination efficiency, and in reality, it is difficult to realize a high-speed scanning of a sample.

For example, Japanese Laid-open Patent Application Publication No. 04-330412, US Patent Application Publication No. 2008/0218849, and Japanese Laid-open Patent Application Publication No. 2013-015681 disclose technologies related to such a problem. Those three documents disclose technologies that improve an illumination efficiency of a disk scanning apparatus.

SUMMARY OF THE INVENTION

An aspect of the present invention permits providing of a scanning apparatus that includes alight source, a spatial light modulator having a flat first reflection surface and modulating an incident beam of light on the first reflection surface, an illumination lens that irradiates the spatial light modulator with a beam of light from the light source and that refracts a principal ray of the beam of light modulated by the spatial light modulator so that an angle between the principal ray and an optical axis of the illumination lens decreases, and a first reflector that directs, toward the illumination lens, a beam of light by reflecting the beam of light multiple times between the illumination lens and a front focal plane of the illumination lens, the beam of light being modulated by the spatial light modulator and entering through the illumination lens.

Another aspect of the present invention permits providing of a confocal observation apparatus that includes the scanning apparatus according to the above-mentioned aspect and an objective, the scanning apparatus including the first reflection surface in a plane optically conjugate with a front focal plane of the objective.

Another aspect of the present invention permits providing of a disk scanning apparatus that includes a light source, a disk having a flat first reflection surface and in which apertures are formed, an illumination lens that irradiates the disk with a beam of light from the light source and that refracts a principal ray of the beam of light reflected on the first reflection surface of the disk so that an angle between the principal ray and an optical axis of the illumination lens decreases, and a first reflector that directs, toward the illumination lens, a beam of light by reflecting the beam of light multiple times between the illumination lens and a front focal plane of the illumination lens, the beam of light being reflected on the disk and entering through the illumination lens, wherein the illumination lens and the disk are arranged so that a first image of the light source is formed, in a state in which the first reflector is excluded, in the front focal plane of the illumination lens.

BRIEF DESCRIPTION OF THE DRAWINGS

The present invention will be more apparent from the following detailed description when the accompanying drawings are referenced.

FIG. 1 illustrates an example of a configuration of a confocal microscope according to a first embodiment of the present invention;

FIG. 4 illustrates a positional relationship between a spinning disk, the illumination lens, and a reflection member in the disk scanning apparatus according to the first embodiment;

FIG. 9 illustrates an example of a portion of a configuration of a disk scanning apparatus according to a third embodiment of the present invention;

FIGS. 11A and 11B illustrate the portion as viewed from directions different from each other;

FIGS. 12A and 12B illustrate an example of a portion of a configuration of a disk scanning apparatus according to a sixth embodiment of the present invention. FIGS. 12A and 12B illustrate the portion as viewed from directions different from each other;

FIG. 17 illustrates an example of a configuration of a confocal microscope according to a tenth embodiment of the present invention;

FIGS. 19A to 19D illustrate relationships for the numbers of recycles that are different from one another;

FIGS. 21A and 21B illustrate the portion as viewed from directions different from each other;

FIGS. 22A and 22B illustrate the portion as viewed from directions different from each other;

FIG. 23 illustrates an example of a configuration of a confocal microscope according to a fourteenth embodiment of the present invention;

DESCRIPTION OF THE EMBODIMENTS

Figure 2:
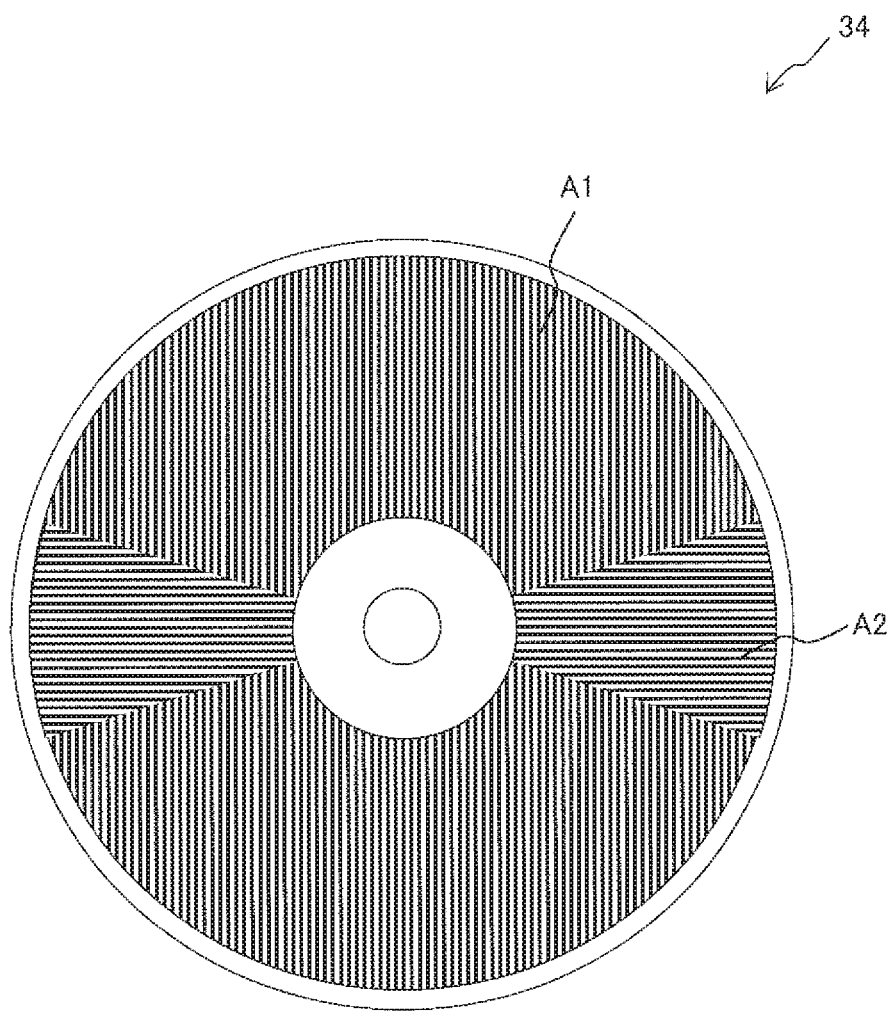
FIG. 2 illustrates an example of a configuration of a spinning disk of FIG. 1.

Japanese Laid-open Patent Application Publication No. 04-330412 and US Patent Application Publication No. 2008/0218849 disclose a microlens array or a micromirror as means for collecting an illumination light on pinholes (apertures) formed in a disk. However, an advanced technique is needed to manufacture such means and to incorporate it into a device.

Japanese Laid-open Patent Application Publication No. 2013-015681 discloses a mirror and a prism as means for inputting the illumination light that has been reflected on a disk into the disk again. The technology disclosed in this document permits, with a simple configuration, a reuse of the illumination light that would conventionally be wasted. Thus, a technology is needed that further improves an illumination efficiency while enjoying the benefits of the technology disclosed in this document.

embodiments of the present invention will now be described.

First Embodiment

FIG. 1 illustrates an example of a configuration of a confocal microscope 100 according to the present embodiment. The confocal microscope 100 is a disk scanning confocal observation apparatus that includes a disk scanning apparatus 30, and is a fluorescence microscope that detects a fluorescence from a sample S to obtain an image of the sample S. The confocal microscope 100 further includes an objective 10 and a tube lens 20 between the sample S and the disk scanning apparatus 30.

The disk scanning apparatus 30 includes a light source 31, a dichroic mirror 32, an illumination lens 33, a spinning disk 34, a lens 35, an imaging device 36, and a reflection member 37.

The light source 31 is, for example, a laser. A laser beam emitted from the light source 31 enters the dichroic mirror 32 through an optical fiber 31a. The dichroic mirror 32 is a light separating element on which a laser beam from the light source 31 is reflected and through which a fluorescence from the sample S is transmitted. The spinning disk 34 is irradiated with the laser beam reflected on the dichroic mirror 32.

The spinning disk 34 is, for example, a rotary disk in which apertures (slits) and shield portions are alternatively formed at a constant pitch, as illustrated in FIG. 2, and has a flat reflection surface 34a on the light source 31 side. The spinning disk 34 illustrated in FIG. 2 includes an area A1 and an area A2 whose respective apertures are formed in directions that are longitudinally different from each other, and the apertures are represented by white lines. The reflection surface 34a is formed by coating with a metal or dielectric film on a substrate of the spinning disk 34, so as to enhance the reflectance with respect to a laser beam. The spinning disk 34 is arranged in a plane optically conjugate with the sample S, that is, in a plane optically conjugate with the front focal plane of the objective 10 (the focal plane on the sample S side).

A portion of the laser beam that has entered the spinning disk 34 enters a slit formed in the spinning disk 34 and passes through the spinning disk 34. The rest of the laser beam is reflected on the reflection surface 34a. A position on the sample S that is optically conjugate with the slit is irradiated, by the tube lens 20 and the objective 10, with the laser beam that has passed through the spinning disk 34.

In the sample S irradiated with the laser beam, a fluorescent material is excited and a fluorescence is emitted. The fluorescence from the sample S is collected by the objective 10 and the tube lens 20 in the spinning disk 34, and only a fluorescence that has occurred from the position optically conjugate with a slit of the spinning disk 34 passes through the spinning disk 34. The fluorescence that has passed through the spinning disk 34 enters the imaging device 36 including a two-dimensional image sensor through the illumination lens 33, the dichroic mirror 32, and the lens 35.

The imaging device 36 is, for example, a CCD (charge-coupled device) camera that includes a CCD image sensor. The imaging device 36 is arranged in a plane optically conjugate with the sample S. In other words, in the confocal microscope 100, the sample S, the spinning disk 34, and the imaging device 36 are arranged in positions optically conjugate with one another. Thus, in the confocal microscope 100, it is possible to scan the sample S to obtain a fluorescent image of the sample S by a position of a slit is changed with the rotation of the spinning disk 34.

Further, in the disk scanning apparatus 30 and the confocal microscope 100, the spinning disk 34, the illumination lens 33, the dichroic mirror 32, and the reflection member 37 function as a recycling optical system that reuses a laser beam reflected on the reflection surface 34a, which will be described below. This permits a realization of a high illumination efficiency.

Figure 3:
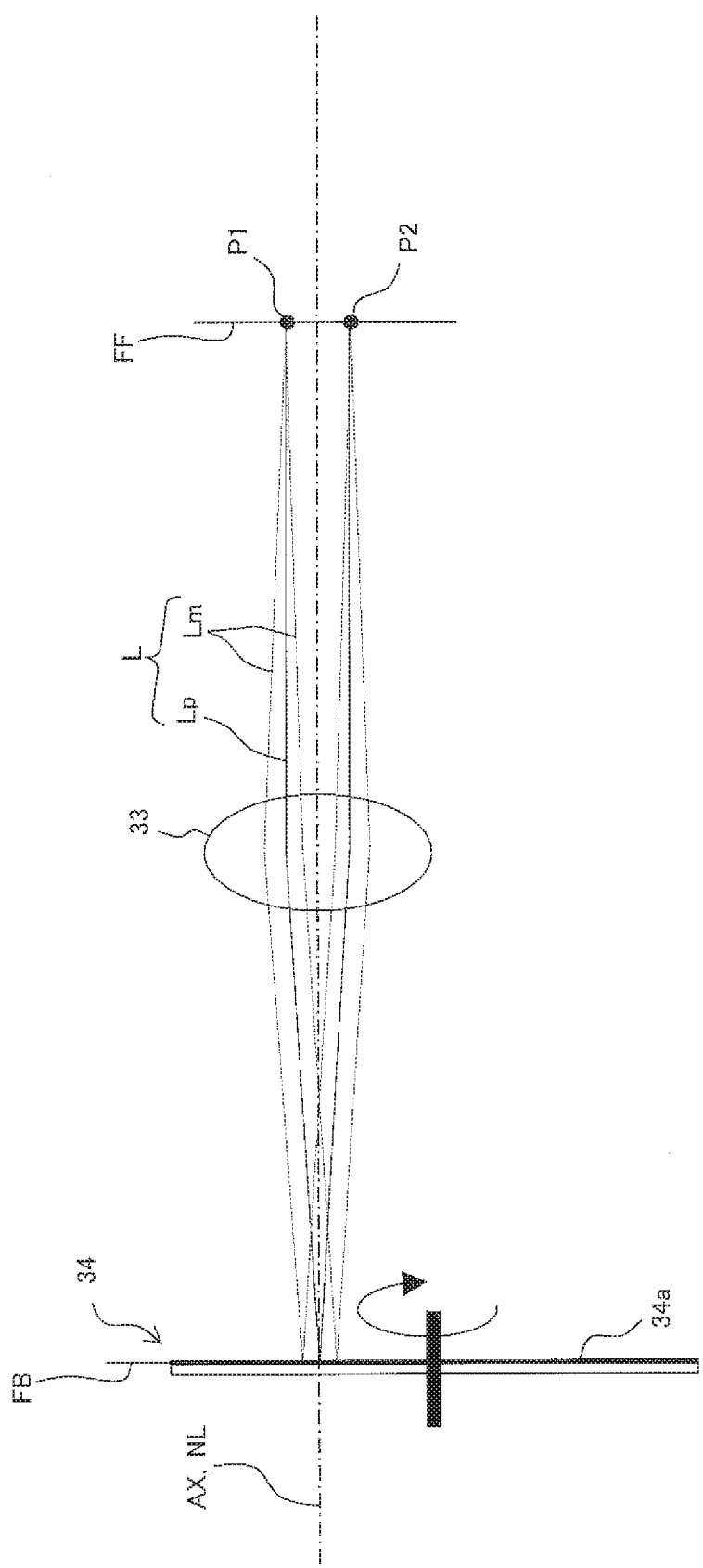
FIG. 3 illustrates an action of an illumination lens in a disk scanning apparatus according to the first embodiment.
Figure 5:
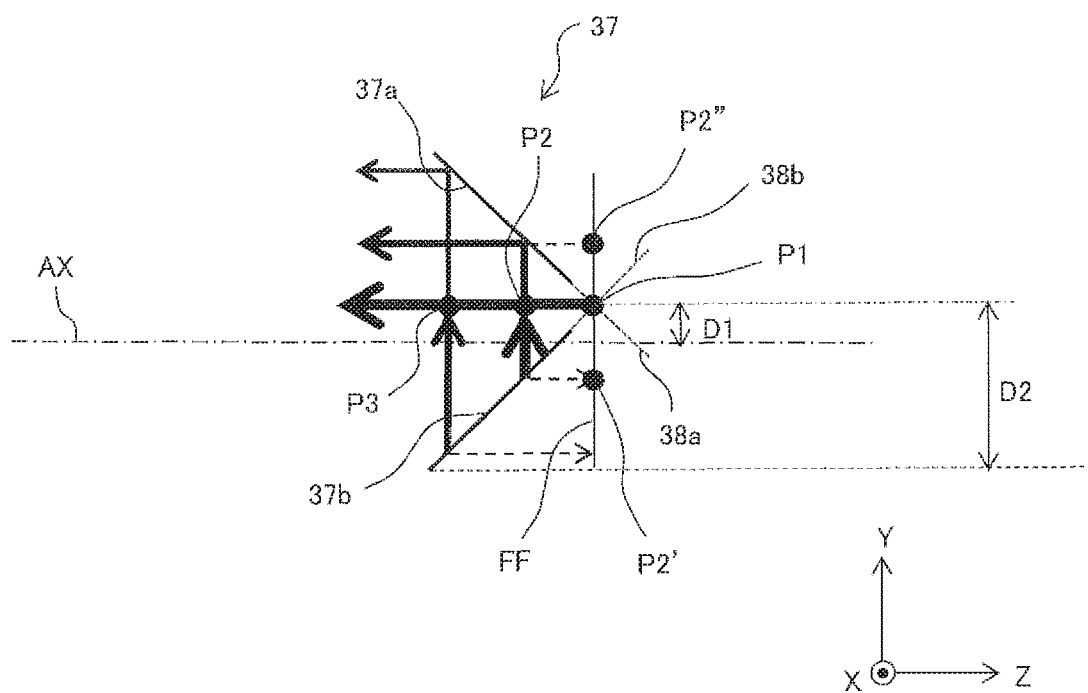
FIG. 5 illustrates the reflection member that is included in the disk scanning apparatus according to the first embodiment.
Figure 6A:
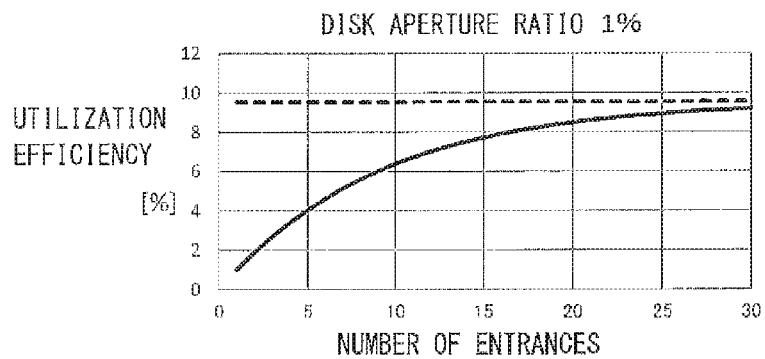
FIGS. 6A to 6D illustrate a relationship between a utilization efficiency and the number of entrances of an illumination light.
Figure 6B:
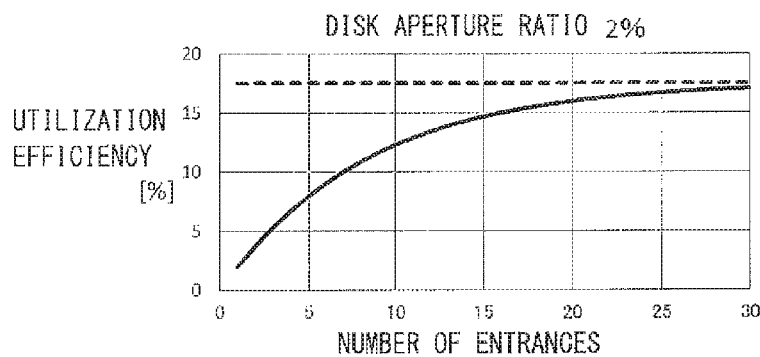
Figure 6C:
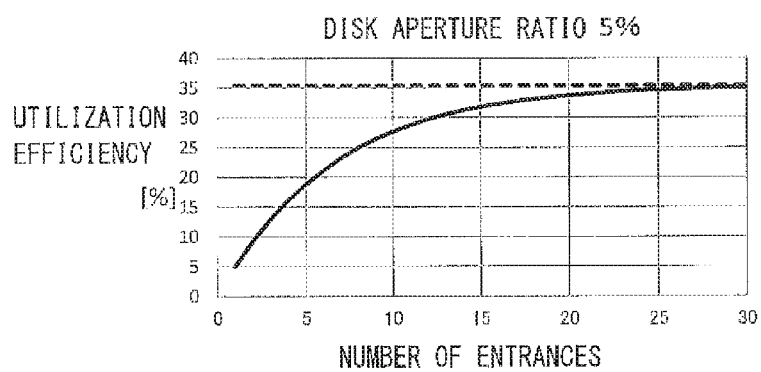
Figure 6D:
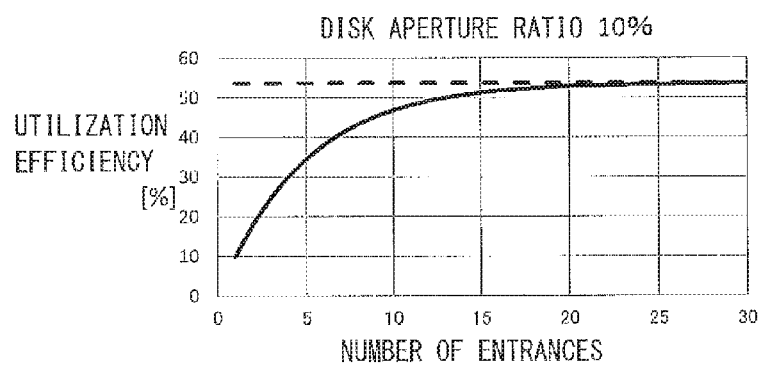

Reuse of a laser beam in the disk scanning apparatus 30 will now be described in detail with reference to FIGS. 3 to 5. FIG. 3 illustrates an action of the illumination lens 33. FIG. 3 illustrates an illumination optical system in the disk scanning apparatus 30, from which the dichroic mirror 32 and the reflection member 37 have been excluded.

In the disk scanning apparatus 30, the reflection surface 34a of the spinning disk 34 is located in a back focal plane FB of the illumination lens 33. A light source image of the light source 31 is formed in a position P1 that is on a front focal plane FF of the illumination lens 33 and is offset from an optical axis AX of the illumination lens 33. Further, the optical axis AX of the illumination lens 33, a normal line NL of the reflection surface 34a of the spinning disk 34, and a principal ray Lp of a beam of light L from the position P1 are parallel.

Thus, the illumination lens 33 acts as follows. First, the illumination lens 33 converts a beam of light L from the position P1 (including a principal ray Lp and a marginal ray Lm) into a collimated beam that is inclined with respect to the normal line NL of the reflection surface 34a, and irradiates the spinning disk 34 with the collimated beam. Further, the illumination lens 33 refracts a principal ray of the collimated beam reflected on the reflection surface 34a without passing through the spinning disk 34, so that an angle between the principal ray and an optical axis AX of the illumination lens 33 decreases. More specifically, the illumination lens 33 refracts a principal ray in a direction parallel with the optical axis AX. As a result of the refraction, to the principal ray collect in a position P2 that is on the front focal plane FF and is offset from the optical axis AX. Here, the illumination lens 33 is preferably arranged so as to be a substantially telecentric optical system. In this case, the illumination lens 33 does not have to be a strictly telecentric optical system, and it is sufficient if the illumination lens 33 permits light to enter the reflection surface 34a at least multiple times.

In concrete terms, the illumination lens 33 acts so that the spinning disk 34 is irradiated with a beam of light from a light source image formed on the front focal plane FF and that the light source image formed in the front focal plane FF is projected onto a different position on the front focal plane FF. In other words, the illumination lens 33 and the spinning disk 34 are arranged, in a state in which the reflection member 37 is excluded, so that the light source image is formed by the illumination lens 33 in the front focal plane FF.

The size of an area to be illuminated in the spinning disk 34 (an area to be irradiated with a laser beam) is dependent on a numerical aperture (NA) in the position P1 and a focal length of the illumination lens 33. Thus, preferably, the NA in the position P1 is not less than a value obtained by dividing a diameter of an area in the spinning disk 34 that has to be illuminated (hereinafter referred to as "illumination target area") by the focal length of the illumination lens 33. Further, preferably, the NA is not excessively large so as not to illuminate an area that does not have to be illuminated.

FIG. 4 illustrates a positional relationship between the spinning disk 34, the illumination lens 33, and the reflection member 37. FIG. 5 illustrates the reflection member 37. A principal ray that is representative of a beam of light from the position P1 is illustrated in FIGS. 4 and 5.

The reflection member 37 is a reflector (a first reflector) that includes two flat mirrors reflecting a beam of light that has entered through the illumination lens 33. The reflection member 37 is arranged between the illumination lens 33 and the front focal plane FF of the illumination lens 33 so that a beam of light from the position P1 enters the illumination lens 33 passing between the two flat mirrors. The two flat mirrors each have a reflection surface (a reflection surface 37a and a reflection surface 37b) whose respective normal lines have directions that are 90 degrees different with respect to each other in a section along the optical axis AX of the illumination lens 33 (a YZ section of FIG. 5). More specifically, the two reflection surfaces each have a normal line, the respective normal lines being perpendicular to each other, and each of the normal lines of the two reflection surfaces forms a 45-degree angle with the optical axis AX. Further, two planes (a plane 38a and a plane 38b) defined by those two reflection surfaces intersect with each other in the front focal plane FF of the illumination lens 33. In this case, a position in which the two planes intersect with each other is the same as the position P1. A plane defined by a reflection surface is a plane that includes that reflection surface. Further, the reflection surface 34a of the spinning disk 34 is a first reflection surface of the disk scanning apparatus 30 and the two reflection surfaces of the reflection member 37 are two second reflection surfaces of the disk scanning apparatus 30.

The collimated beam reflected on the reflection surface 34a without passing through the spinning disk 34 is converted by the illumination lens 33 into a convergent beam that is parallel with the optical axis AX. After that, the convergent beam is reflected on the reflection surface 37b before it is collected in a position P2' on the front focal plane FF, and is collected in the position P2 to form a light source image before it is reflected on the reflection surface 37a. A beam of light from the position P2 is reflected on the reflection surface 37a in a direction parallel with the optical axis AX and enters the illumination lens 33. The reflection member 37 is arranged so that the light source image is formed by the illumination lens 33 in a position (the position P2) that is optically equivalent to the front focal plane FF. Thus, the beam of light from the position P2 is converted again into a collimated beam by the illumination lens 33 and enters the spinning disk 34 because it is equivalent to a beam of light from a position P2'' on the front focal plane FF. The position P1 and the position P2 are hereinafter referred to as "light source image position", and the position P2' and the position P2'' are hereinafter referred to as "pseudo light source image position". Further, a light source image, such as a light source image formed in the position P2', which is formed in a state in which the reflection member 37 is excluded is referred to as "first image", and a light source image, such as a light source image formed in the position P2, which is actually formed is referred to as "second image". A light source image that is formed in the same position in spite of the presence or absence of the reflection member 37 is a first image and a second image.

In other words, the reflection member 37 directs, toward the illumination lens 33, the beam of light reflected on the reflection surface 34a and entering through the illumination lens 33, by reflecting the beam of light between the illumination lens 33 and the front focal plane FF of the illumination lens 33 multiple times, so that the beam of light is converted by the illumination lens 33 into a collimated beam. More specifically, the reflection member 37 converts the incident beam of light into a divergent beam that has an inverted travelling direction and has been shifted in a direction perpendicular to the optical axis AX.

As a result, in the disk scanning apparatus 30, the laser beam reflected on the reflection surface 34a re-enters the spinning disk 34 and is reused. Further, the re-entrance of the laser beam is repeated unless the beam of light reflected on the reflection surface 34a and converged by the illumination lens 33 is deviated from the reflection member 37. In the disk scanning apparatus 30, a position to enter the reflection surfaces (the reflection surface 37a and the reflection surface 37b) of the reflection member 37 is shifted by 2×D1 in a Y-axis direction every time the re-entrance is repeated when a distance between an initial entering position of the laser beam (that is, the position P1) and the optical axis AX is D1, as illustrated in FIG. 5. Thus, the number of re-entrances is D2/(2×D1) when a width of the mirrors in the Y-axis direction that constitute the reflection member 37 is D2. For example, when the disk scanning apparatus 30 is designed when D1=0.25 mm and D2=10 mm, the beam of light from the position P1 re-enters the spinning disk 34 twenty times.

Thus, the disk scanning apparatus 30 permits a laser beam to re-enter the spinning disk 34 multiple times, which results in realizing a high illumination efficiency. Regarding the illumination efficiency of the disk scanning apparatus 30, as illustrated in FIGS. 6A to 6D, an about-25-to-30-times-repeated re-entrance of light permits obtaining of an illumination efficiency almost similar to when light re-enters the unlimited number of times, regardless of an disk aperture ratio. The disk aperture ratio is a proportion of an area of the apertures in an illuminated area to an area of the illuminated area in the disk. Thus, the disk scanning apparatus 30 is preferably designed so that D2/(2×D1) is about 30.

FIGS. 6A to 6D illustrate a relationship between a utilization efficiency of an illumination light and the number of entrances of an illumination light when a disk aperture ratio is 1%, 2%, 5%, or 10%. A dashed line represents an illumination efficiency when the light enters the unlimited number of times, that is, a limiting illumination efficiency of the disk scanning apparatus 30, and a solid line represents the utilization efficiency in the disk scanning apparatus 30 for each number of re-entrances. In FIGS. 6A to 6D, the illumination efficiency (a utilization efficiency of an illumination light) of the disk scanning apparatus 30 is calculated under the following conditions:

Reflectance of the spinning disk 34 (the reflection surface 34a) $R_{DISK}$=990

Reflectance of the dichroic mirror 32 $R_{DM}$=99%

Reflectance of the reflection member 37 (the reflection surface 37a and the reflection surface 37b) $R_{MIRROR}$=99%

Transmittance of the illumination lens 33 $T_{LENS}$=98%

Re-entrance ratio r=91.3% (=$R_{DISK} \times R_{DM}^2 \times T_{LENS}^2 \times R_{MIRROR}^2$)

Higher reflectance of the spinning disk 34 $R_{DISK}$, higher reflectance of the dichroic mirror 32 $R_{DM}$, higher reflectance of the reflection member 37 $R_{MIRROR}$, and higher transmittance of the illumination lens 33 $T_{LENS}$ are more desirable. The reason is that, if these are higher, a higher illumination efficiency can be realized in the disk scanning apparatus 30.

The present embodiment illustrates an example in which the reflection surface 34a is located in the back focal plane FB of the illumination lens 33. However, it is sufficient if the reflection surface 34a is arranged in the back focal plane FB of the illumination lens 33 or in the proximity of the back focal plane FB. When the reflection surface 34a is located at a great distance from the back focal plane FB of the illumination lens 33, a collimated beam reflected on the reflection surface 34a is converted by the illumination lens 33 into a beam of light that has a large angle with respect to the optical axis AX. The beam of light having a large angle with respect to the optical axis AX is easily deviated from the reflection member 37. On the other hand, when the reflection surface 34a is arranged in the back focal plane FB of the illumination lens 33 or in the proximity of the back focal plane FB, the collimated beam reflected on the reflection surface 34a is refracted by the illumination lens 33 so that an angle between a principal ray of the collimated beam and the optical axis AX decreases. As a result, the collimated beam is converted into a beam of light whose principal ray has a small angle with respect to the optical axis AX. In other words, the collimated beam reflected on the reflection surface 34a is converted in a substantially telecentric manner. This permits a realization of a predetermined-number-of-times repetition without being deviated from the reflection member 37.

When the reflection surface 34a is arranged in the back focal plane FB of the illumination lens 33, a laser beam repeatedly enters the same area of the spinning disk 34. Thus, an area to be illuminated is constant. In this case, the laser beam reflected on the reflection surface 34a enters the reflection surface 34a again without entering a slit. However, in reality, the laser beam does not enter exactly the same area due to an effect of aberrations of an optical system and the like. Thus, even when the reflection surface 34a is arranged in the back focal plane FB of the reflection surface 34a, an illumination efficiency is improved. In order to realize a higher illumination efficiency, the reflection surface 34a is preferably arranged in the proximity of the back focal plane FB.

Further, the present embodiment illustrates an example in which the plane 38a and the plane 38b intersect with each other in the front focal plane FF of the illumination lens 33. However, it is sufficient if the plane 38a and the plane 38b intersect with each other in the front focal plane FF of the illumination lens 33 or in the proximity of the front focal plane FF. In this case, "in the proximity of the front focal plane FF" refers to "within a focal depth defined by an NA in the position P1. When the plane 38a and the plane 38b intersect with each other within the focal depth from the front focal plane FF, the pseudo light source image positions (the position P2' and the position P2") are also located within the focal depth from the front focal plane FF. This permits the reflection member 37 to direct an incident beam of light toward the illumination lens 33 so that the beam of light is converted into a collimated beam by the illumination lens 33.

As described above, in the disk scanning apparatus 30, a recycling optical system can be arranged without any precise alignment. Thus, the disk scanning apparatus 30 permits an easy realization of a high illumination efficiency without any complicated adjustment.

Further, the present embodiment illustrates the spinning disk 34 in which the apertures (slits) and the shield portions are alternately formed at a constant pitch. However, it is sufficient if the disk scanning apparatus 30 includes a disk in which apertures that function as a confocal aperture are formed, and the disk scanning apparatus 30 may include, for example, a so-called Nipkow disk in which pinholes are formed, instead of the spinning disk 34.

Further, in the present embodiment, the front focal plane FF of the illumination lens 33 is projected onto an exit pupil plane (a back focal plane) of the objective 10. Thus, the light source images (the position P1 and the position P2) and the pseudo light source images (the position P2' and the position P2"), too, are projected onto the exit pupil plane of the objective 10, but when they are projected onto outside the pupil diameter of the objective 10, vignetting occurs in the objective 10, which results in decreasing an illumination efficiency. Therefore, the reflection member 37 preferably has a size not greater than a value obtained by dividing the pupil diameter of the objective 10 by a projection magnification from the front focal plane FF to the exit pupil plane. The reason is that a range in which a light source image and a pseudo light source image are formed is dependent on the size of the reflection member 37. Further, in order to ensure an NA for illumination as large as possible, the reflection member 37 preferably has a size similar to the value obtained by dividing the pupil diameter by the projection magnification.

Furthermore, the present embodiment illustrates an example of forming a light source image by arranging an exit end of an optical fiber in the position P1, but the confocal microscope 100 may include a light source itself in the position P1. The light source image formed in the position P1 or the light source is preferably a point light source. The front focal plane FF of the illumination lens 33 is projected by the illumination lens 33 and the tube lens 20 onto the pupil plane of the objective 10 at a projection magnification not greater than 1×. This permits suppressing of the light amount loss caused by the vignetting in the objective 10.

Figure 7:
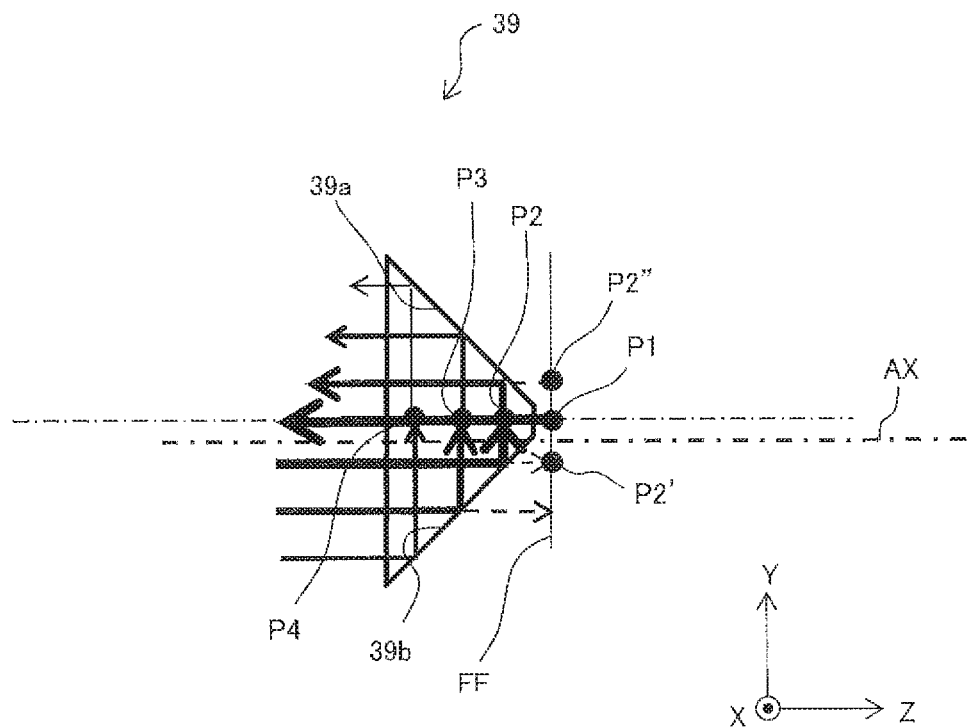
FIG. 7 illustrates a modification of the reflection member that is included in the disk scanning apparatus according to the first embodiment.

Moreover, the present embodiment illustrates the reflection member 37 formed by two flat mirrors, but the disk scanning apparatus 30 may include a prism 39 illustrated in FIG. 7 instead of the reflection member 37. The prism 39 has two reflection surfaces (a reflection surface 39a and a reflection surface 39b) whose respective normal lines have directions that are 90 degrees different with respect to each other in a section along the optical axis AX of the illumination lens 33 (the YZ section of FIG. 7). Two planes defined by those two reflection surfaces intersect with each other in the front focal plane FF of the illumination lens 33.

Second Embodiment

Figure 8:
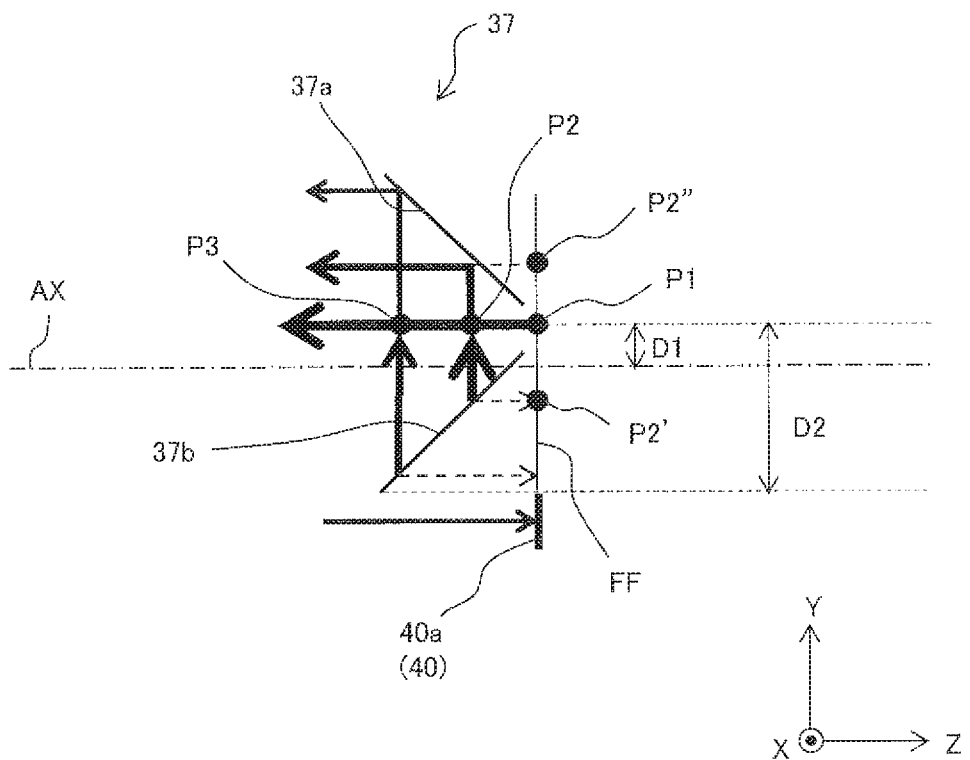
FIG. 8 illustrates an example of a portion of a configuration of a disk scanning apparatus according to a second embodiment of the present invention.

FIG. 8 illustrates an example of a portion of a configuration of a disk scanning apparatus according to the present embodiment. The disk scanning apparatus according to the present embodiment is different from the disk scanning apparatus 30 according to the first embodiment in including a reflection member 40. The reflection member 40 has, in the front focal plane FF of the illumination lens 33, a reflection surface 40a perpendicular to the optical axis AX. The others in the configuration are similar to those of the disk scanning apparatus 30. The reflection surface 40a of the reflection member 40 is a third reflection surface of the disk scanning apparatus.

The reflection member 40 is a second reflector that directs, toward the illumination lens 33, the beam of light reflected on the reflection surface 34a and entering through the illumination lens 33. The reflection member 40 is arranged in a position on the front focal plane FF which a laser beam deviated from the reflection member 37 as a result of re-entering the spinning disk 34 repeatedly enters. Further, the reflection member 40 is arranged in a position farther away than the reflection member 37 from the optical axis AX. The beam of light entering the reflection member 40 is reflected on the reflection surface 40a, and its travelling direction is inverted. This permits the laser beam to further re-enter the spinning disk 34 the same number of times as before it entered the reflection member 40.

Thus, compared with the disk scanning apparatus 30, the disk scanning apparatus according to the present embodiment permits doubling of the number of re-entrances. This results in realizing an illumination efficiency higher than that of the disk scanning apparatus 30. The reflection member 40 may be arranged in the proximity of the front focal plane FF for the reason similar to the reason that it is sufficient if the plane 38a and the plane 38b intersect with each other in or in the proximity of the front focal plane FF. Further, the direction in which a beam of light with which the spinning disk 34 is irradiated by the illumination lens 33 is inclined with respect to the optical axis AX is inverted before and after a fold-reflection on the reflection member 40. This permits a mitigation of a bias in the illumination intensity distribution in the exit pupil plane of the objective 10.

Third Embodiment

FIG. 9 illustrates an example of a portion of a configuration of a disk scanning apparatus according to the present embodiment. The disk scanning apparatus according to the present embodiment is different from the disk scanning apparatus 30 according to the first embodiment in including a reflection member 41 instead of the reflection member 37 and in introducing a laser beam from outside the reflection member 37. The others in the configuration are similar to those of the disk scanning apparatus 30.

The reflection member 41 is similar to the reflection member 37 in including two flat mirrors and in that the two flat mirrors each have a reflection surface (a reflection surface 41a and a reflection surface 41b) whose respective normal lines have directions that are 90 degrees different with respect to each other in a section along the optical axis AX of the illumination lens 33 (the YZ section of FIG. 9). However, it is different from the reflection member 37 in that those two reflection surfaces intersect and are in contact with each other in the front focal plane FF of the illumination lens 33.

As illustrated in FIG. 9, in the disk scanning apparatus according to the present embodiment, an exit end of the optical fiber 31a (the position P1) is arranged on the front focal plane FF and in a position farther away than the reflection member 41 from the optical axis AX. This permits a laser beam to gradually move from outside to inside the reflection member 41 every time it re-enters the reflection member 41. Then, when getting close to the center, the laser beam moves from the inside to the outside.

Thus, compared with the disk scanning apparatus 30, the disk scanning apparatus according to the present embodiment permits doubling of the number of re-entrances. This results in realizing a high illumination efficiency as is the case with the disk scanning apparatus according to the second embodiment. It is also similar to the disk scanning apparatus according to the second embodiment in being able to mitigate a bias in the illumination intensity distribution in the exit pupil plane of the objective 10. When the flat mirrors are narrowly spaced with respect to each other, they may be arranged away from each other in the reflection member 41 as is the case in the reflection member 37.

Fourth Embodiment

Figure 10:
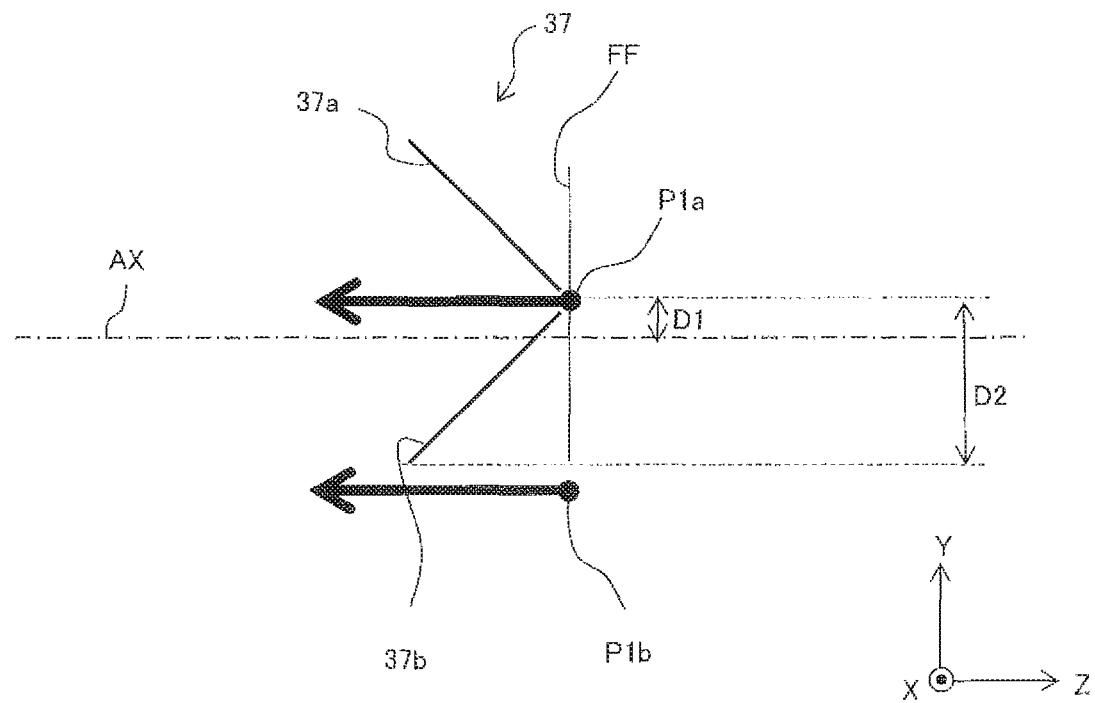
FIG. 10 illustrates an example of a portion of a configuration of a disk scanning apparatus according to a fourth embodiment of the present invention.

FIG. 10 illustrates an example of a portion of a configuration of a disk scanning apparatus according to the present embodiment. The disk scanning apparatus according to the present embodiment is different from the disk scanning apparatus 30 in splitting the optical fiber 31a halfway so as to arrange exit ends in two locations, in a position P1a and a position P1b. The others in the configuration are similar to those of the disk scanning apparatus 30.

A laser beam from the position P1a gradually moves from inside to outside the reflection member 37 every time it re-enters the reflection member 37. Thus, the amount of light that enters a slit at a small angle and is transmitted through the spinning disk 34 is larger than the amount of light that enters the slit at a large angle and is transmitted through the spinning disk 34. On the other hand, a laser beam from the position P1b gradually moves from outside to inside the reflection member 37 every time it re-enters the reflection member 37. Thus, the amount of light that enters a slit at a large angle and is transmitted through the spinning disk 34 is larger than the amount of light that enters the slit at a small angle and is transmitted through the spinning disk 34. This permits the illumination intensity distribution in the exit pupil plane of the objective 10 to approximate a distribution more symmetrical with respect to an optical axis of objective 10, compared to the cases of the disk scanning apparatuses according to the second and third embodiments.

Thus, the disk scanning apparatus according to the present embodiment permits suppressing of an angular dependency of the intensity of an illumination light with which the sample S is irradiated while easily realizing a high illumination efficiency.

Fifth Embodiment

Figure 11A:
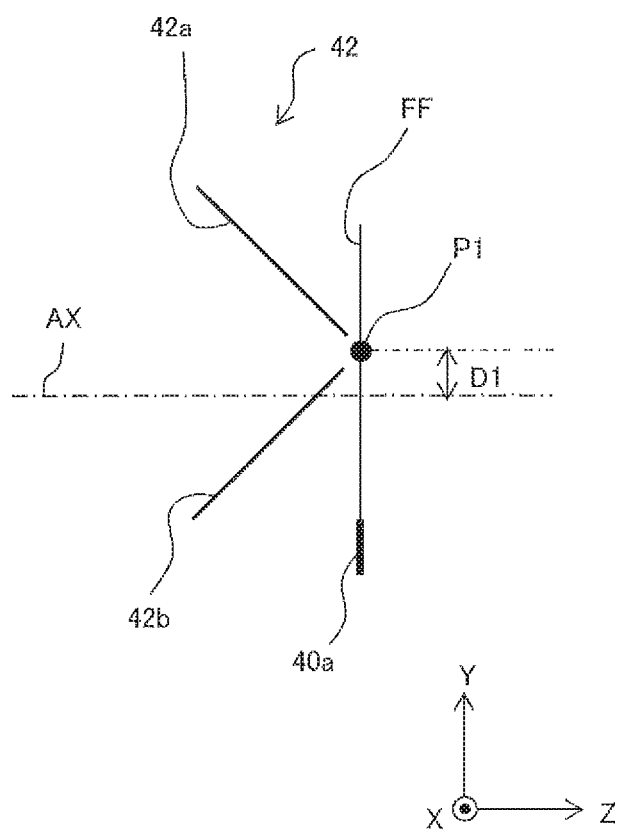
FIGS. 11A and 11B illustrate an example of a portion of a configuration of a disk scanning apparatus according to a fifth embodiment of the present invention.
Figure 11B:
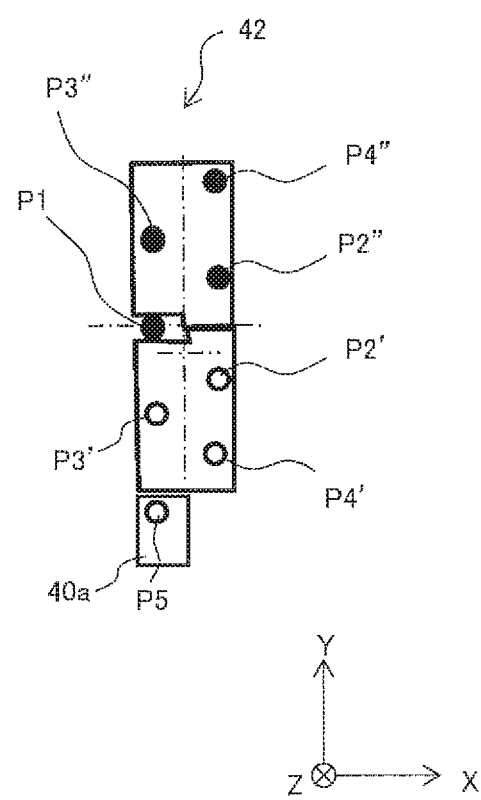

FIGS. 11A and 11B illustrate an example of a portion of a configuration of a disk scanning apparatus according to the present embodiment. FIG. 11A is a YZ-sectional view, and FIG. 11B illustrates the portion as viewed from a Z-axis direction. The disk scanning apparatus according to the present embodiment is different from the disk scanning apparatus according to the second embodiment in arranging the exit end of the optical fiber 31a in the position P1 offset from the optical axis AX not only in the Y-axis direction but also in an X-axis direction. The others in the configuration are similar to those of the disk scanning apparatus according to the second embodiment.

The position (the position P2') in which a laser beam that reflected on the reflection surface 34a enters a reflection member 42, too, varies both in the X-axis and Y-axis directions because the position (the position P1) in which a light source image is formed is offset from the optical axis AX both in the X-axis and Y-axis directions. In other words, a shift amount is shared in the X-axis and Y-axis directions. This permits a realization of the same number of re-entrances as that with the disk scanning apparatus 30 using flat mirrors smaller than those used in the disk scanning apparatus 30.

White circles (the position P2', a position P3', a position P4', and a position P5') illustrated in FIG. 11B represent a n incident position at which a laser beam is incident on the reflecting surface 42b or the reflection surface 40a. Further, black circles (the position P2'', a position P3'', and a position P4'') represent an incident position at which a laser beam is incident on the reflecting surface 42a. However, the black circle illustrated in the position P1 represents a position of the exit end of the optical fiber 31a.

Thus, the disk scanning apparatus according to the present embodiment permits an easy realization of a high illumination efficiency, as is the case in the disk scanning apparatus according to the second embodiment. Further, a reflection member can be made smaller.

Sixth Embodiment

FIGS. 12A and 12B illustrate an example of a portion of a configuration of a disk scanning apparatus according to the present embodiment. FIG. 12A is the YZ-sectional view, and FIG. 12B illustrates the portion as viewed from the Z-axis direction. The disk scanning apparatus according to the present embodiment is different from the disk scanning apparatus according to the fifth embodiment in splitting the optical fiber 31a halfway so as to arrange exit ends in two locations, in the position P1a and the position P1b. The others in the configuration are similar to those of the disk scanning apparatus according to the fifth embodiment.

The position P1a is the same as the position P1 of the fifth embodiment. The position P1b is a position offset from the reflection surface 40a in the X-axis direction.

Thus, like the disk scanning apparatus according to the fourth embodiment, the disk scanning apparatus according to the present embodiment permits an easy realization of a high illumination efficiency and permits suppressing of an angular dependency of the intensity of an illumination light with which the sample S is irradiated. Further, as is the case in the disk scanning apparatus according to the fifth embodiment, a reflection member can be made smaller.

Seventh Embodiment

Figure 13:
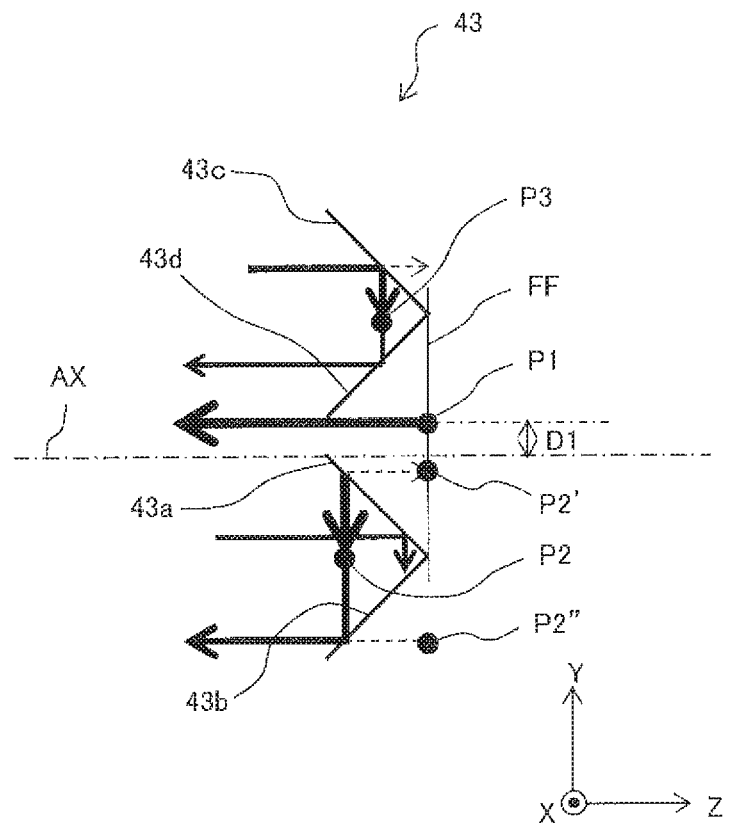
FIG. 13 illustrates an example of a portion of a configuration of a disk scanning apparatus according to a seventh embodiment of the present invention.

FIG. 13 illustrates an example of a portion of a configuration of a disk scanning apparatus according to the present embodiment. The disk scanning apparatus according to the present embodiment is different from the disk scanning apparatus 30 in including a reflection member 43 instead of the reflection member 37. The others in the configuration are similar to those of the disk scanning apparatus 30.

The reflection member 43 includes four flat mirrors. Two of the four flat mirrors each have a reflection surface (a reflection surface 43a and a reflection surface 43b) whose respective normal lines have directions that are 90 degrees different with respect to each other in a section along the optical axis AX. Those two reflection surfaces intersect and are in contact with each other in the front focal plane FF. Further, the remaining two flat mirrors, too, each have a reflection surface (a reflection surface 43c and a reflection surface 43d) whose respective normal lines have directions that are 90 degrees different with respect to each other in a section along the optical axis AX. Those two reflection surfaces intersect and are in contact with each other in the front focal plane FF. In other words, the reflection member 43 is constituted of two reflection member elements each including two flat mirrors.

Further, the reflection member 43 is arranged between the illumination lens 33 and the front focal plane FF of the illumination lens 33 so that a beam of light from the position P1 enters the illumination lens 33 passing between the two reflection member elements. The position P1 is a position obtained by moving from the optical axis AX by a distance D1 in a Y-direction.

In the disk scanning apparatus according to the present embodiment, a laser beam reflected on the reflection surface 34a sequentially enters the two reflection member elements. Then, in one of the reflection member elements, the laser beam moves toward a direction farther away from the optical axis AX every time it enters. In the other reflection member element, the laser beam moves toward a direction closer to the optical axis AX every time it enters. In other words, the laser beam repeats the moves toward the direction farther away from the optical axis AX and toward the direction closer to the optical axis AX in an alternate manner. This permits the illumination intensity distribution in the exit pupil plane of the objective 10 to approximate a distribution more symmetrical about the optical axis of the objective 10.

Thus, the disk scanning apparatus according to the present embodiment permits an easy realization of a high illumination efficiency and permits suppressing of an angular dependency of the intensity of an illumination light with which the sample S is irradiated.

The disk scanning apparatus according to the present embodiment, too, permits doubling of the number of re-entrances by providing the reflection member 40 on the front focal plane FF. Further, if the position P1 is offset from the optical axis AX not only in the Y-direction but also in an X-direction, a reflection member can be made smaller.

Eighth Embodiment

Figure 14:
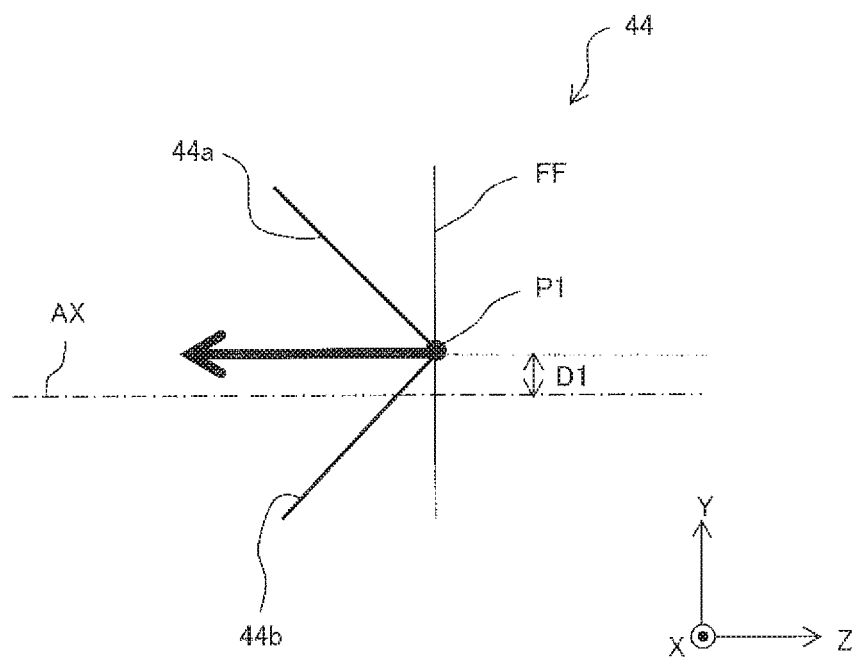
FIG. 14 illustrates an example of a portion of a configuration of a disk scanning apparatus according to an eighth embodiment of the present invention.

FIG. 14 illustrates an example of a portion of a configuration of a disk scanning apparatus according to the present embodiment. The disk scanning apparatus according to the present embodiment is different from the disk scanning apparatus 30 in including a reflection member 44 instead of the reflection member 37. The others in the configuration are similar to those of the disk scanning apparatus 30.

The reflection member 44 is a conical mirror whose apex is in the position P1 on the front focal plane FF. The reflection member 44 is similar to the reflection member 37 in having two reflection surfaces (a reflection surface 44a and a reflection surface 44b) whose respective normal lines have directions that are 90 degrees different with respect to each other in a section along the optical axis AX, those two reflection surfaces intersecting with each other in the front focal plane FF. However, the reflection member 44 does not have power in a YZ-plane, but has power in an XY-plane. Thus, in the disk scanning apparatus according to the present embodiment, the laser beam reflected on the reflection surface 34a is not collected on one point and then a point image is not formed, but like the disk scanning apparatus 30, it permits the laser beam to re-enter the spinning disk 34 multiple times.

Thus, the disk scanning apparatus according to the present embodiment, too, permits an easy realization of a high illumination efficiency.

Ninth Embodiment

Figure 15:
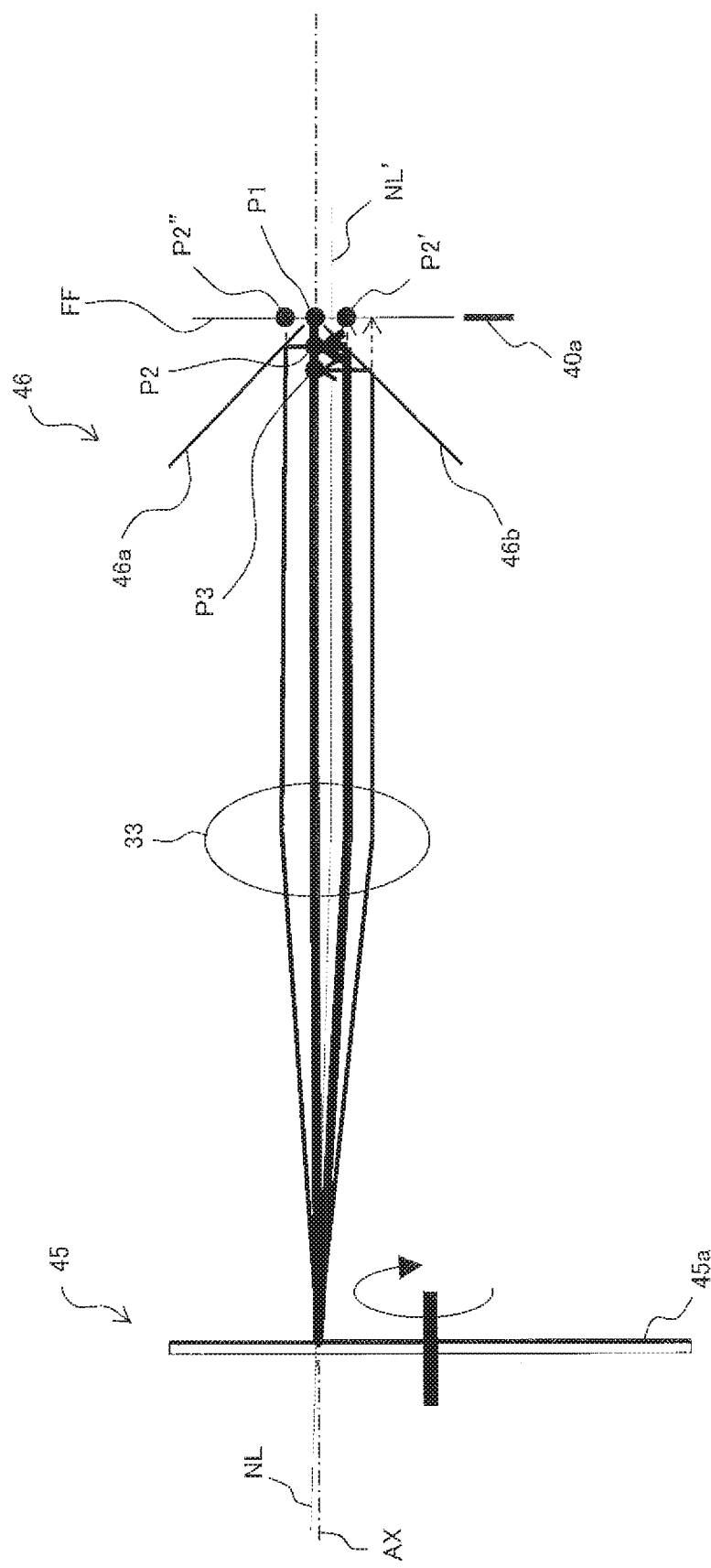
FIG. 15 illustrates a positional relationship between the spinning disk, the illumination lens, and the reflection member in a disk scanning apparatus according to a ninth embodiment of the present invention.
Figure 16:
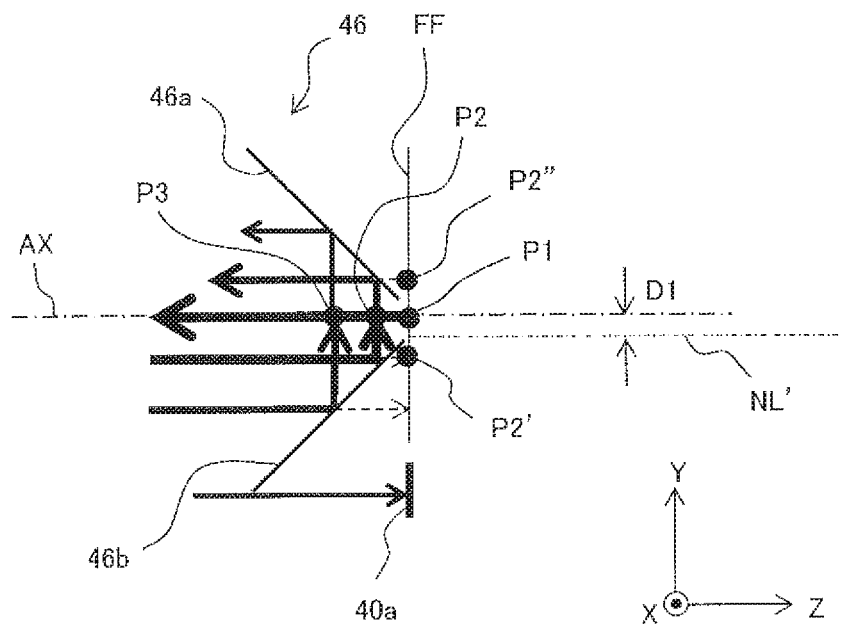
FIG. 16 illustrates the reflection member included in the disk scanning apparatus according to the ninth embodiment.

FIG. 15 illustrates a positional relationship between a spinning disk 45, the illumination lens 33, and a reflection member 46 in a disk scanning apparatus according to the present embodiment. FIG. 16 illustrates the reflection member 46.

The disk scanning apparatus according to the present embodiment is different from the disk scanning apparatus according to the second embodiment in including the spinning disk 45 instead of the spinning disk 34, in including the reflection member 46 instead of the reflection member 37, and in introducing a laser beam from on the optical axis AX.

The spinning disk 45 is different from the spinning disk 34 in that a normal line NL of a reflection surface 45a is inclined with respect to the optical axis AX of the illumination lens 33. A line NL' traces the normal line NL, and is a line that is parallel with the optical axis AX and formed by refracting the normal line NL at the illumination lens 33.

The reflection member 46 is similar to the reflection member 37 in including two flat mirrors each having a reflection surface (a reflection surface 46a and a reflection surface 46b) whose respective normal lines have directions that are 90 degrees different with respect to each other in a section along the optical axis AX. Further, the reflection member 46 is similar to the reflection member 37 in that two planes defined by those two reflection surfaces intersect with each other in the front focal plane FF of the illumination lens 33. However, the reflection member 46 is different from the reflection member 37 in that the two planes defined by those two reflection surfaces intersect with each other on the optical axis AX.

The reflection member 46 directs, toward the illumination lens 33, the beam of light reflected on the reflection surface 45a and entering through the illumination lens 33, by reflecting the beam of light multiple times, so that the beam of light is converted into a collimated beam by the illumination lens 33. More specifically, the reflection member 46 converts the incident beam of light into a beam of light that has an inverted travelling direction and has been shifted in a direction perpendicular to the optical axis AX. A shift amount is 2×D1 when a distance between an entering position of a laser beam (that is, the position P1) and the line NL' is D1.

Thus, like the disk scanning apparatus 30 according to the second embodiment, the disk scanning apparatus according to the present embodiment, too, permits an easy realization of a high illumination efficiency.

Tenth Embodiment

FIG. 17 illustrates an example of a configuration of a confocal microscope 200 according to the present embodiment. The confocal microscope 200 according to the present embodiment is a disk scanning confocal observation apparatus that includes a disk scanning apparatus 50, and is an industrial microscope that is used, for example, for testing a semiconductor substrate.

The confocal microscope 200 is different from the confocal microscope 100 in including the disk scanning apparatus 50 instead of the disk scanning apparatus 30, and in including a λ/4 plate 60 between the objective 10 and the tube lens 20. The disk scanning apparatus 50 is different from the disk scanning apparatus 30 in including, instead of the dichroic mirror 32, a polarization beam splitter (PBS) 51 that is a light separating element separating an S-polarized light and a P-polarized light.

In the confocal microscope 200, a polarized light that has a specific polarization direction (for example, an S-) in laser beams from the light source 31 is reflected on the PBS 51, and is emitted from the disk scanning apparatus 50. Then, a laser beam emitted from the disk scanning apparatus 50 passes through the λ/4 plate 60 twice until light reflected on the sample S enters the disk scanning apparatus 50 again. Thus, the laser beam enters the imaging device 36 passing through the PBS 51 because it enters the PBS 51 as a P-polarized light.

The disk scanning apparatus 50 and the confocal microscope 200 permit providing of an advantage similar to that provided by the disk scanning apparatus 30 and the confocal microscope 100, that is, they permit an easy realization of a high illumination efficiency.

Eleventh Embodiment

Figure 18:
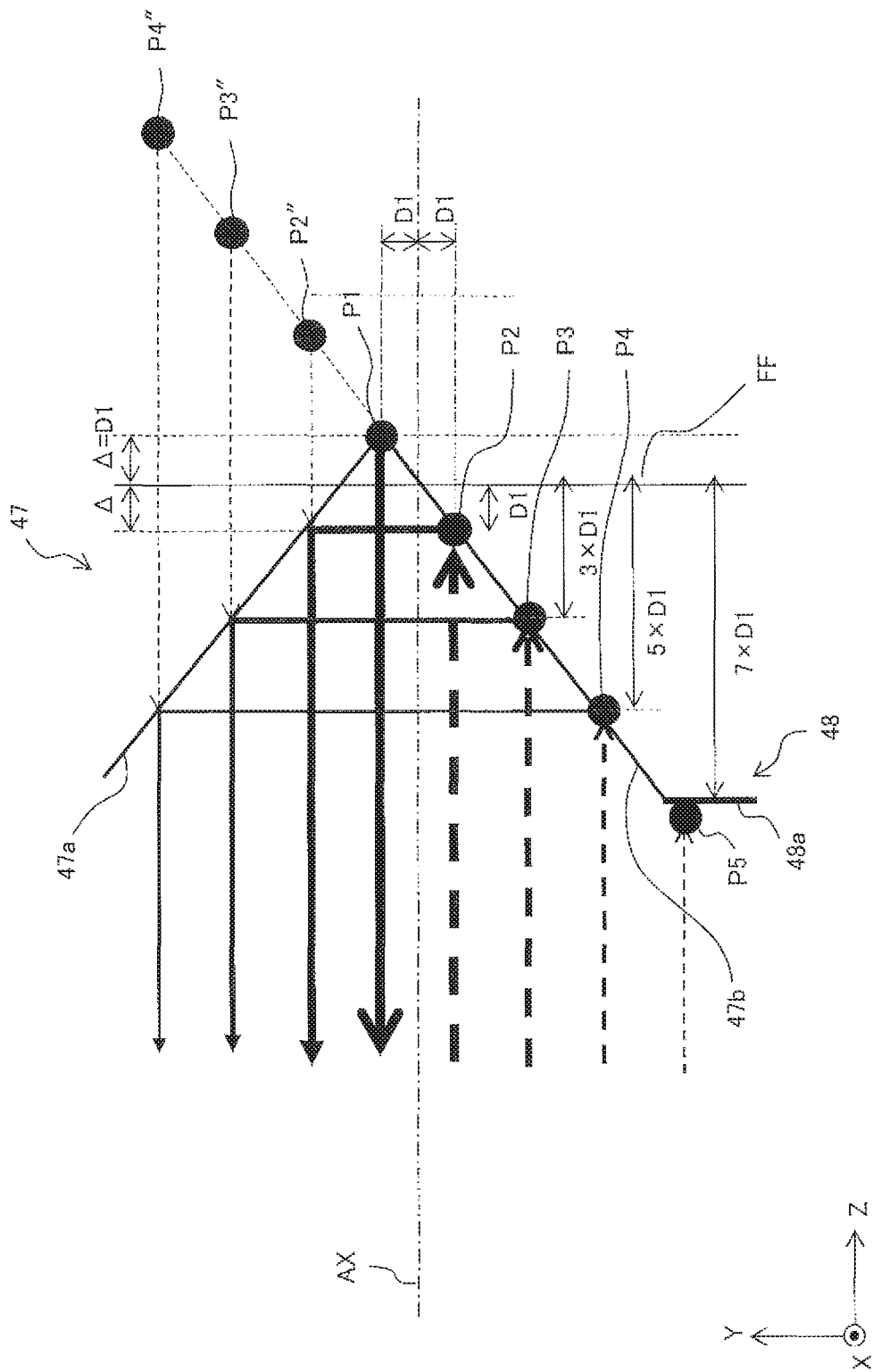
FIG. 18 illustrates an example of a portion of a configuration of a disk scanning apparatus according to an eleventh embodiment of the present invention.

FIG. 18 illustrates an example of a portion of a configuration of a disk scanning apparatus according to the present embodiment. FIGS. 19A to 19D illustrate positional relationships between a front focal plane of a 4f optical system and a light source image. The disk scanning apparatus according to the present embodiment is different from the disk scanning apparatus according to the second embodiment illustrated in FIG. 8 in including a reflection member 47 instead of the reflection member 37, in further including a reflection member 48 instead of the reflection member 40, and in an initial entering position of a laser beam. The others in the configuration are similar to those of the disk scanning apparatus according to the second embodiment.

The position P1 that is an initial entering position of a laser beam is a position offset by D1 from the optical axis AX of the illumination lens 33, and farther away than the front focal plane FF by $\Delta$ from the illumination lens 33. In this case, the illumination lens 33 that constitutes the 4f optical system along with the spinning disk 34 acts so that a light source image formed away than the front focal plane FF from the illumination lens 33 is projected onto a position that is closer than the front focal plane FF to the illumination lens 33. In other words, the illumination lens 33 and the reflection member 44 are arranged so that the light source image is formed, in a state in which the reflection member 47 is excluded, by the illumination lens 33 in a position that is closer than the front focal plane FF to the illumination lens 33. This matter will be described with reference to FIGS. 19A to 19D, using an example of a 4f optical system that is constituted of a lens L and a reflection surface RS2. The reflection surface RS2 is a reflection surface on which arranged away from the lens L by a focal length f of the lens L and on which light is folded.

Figure 19:
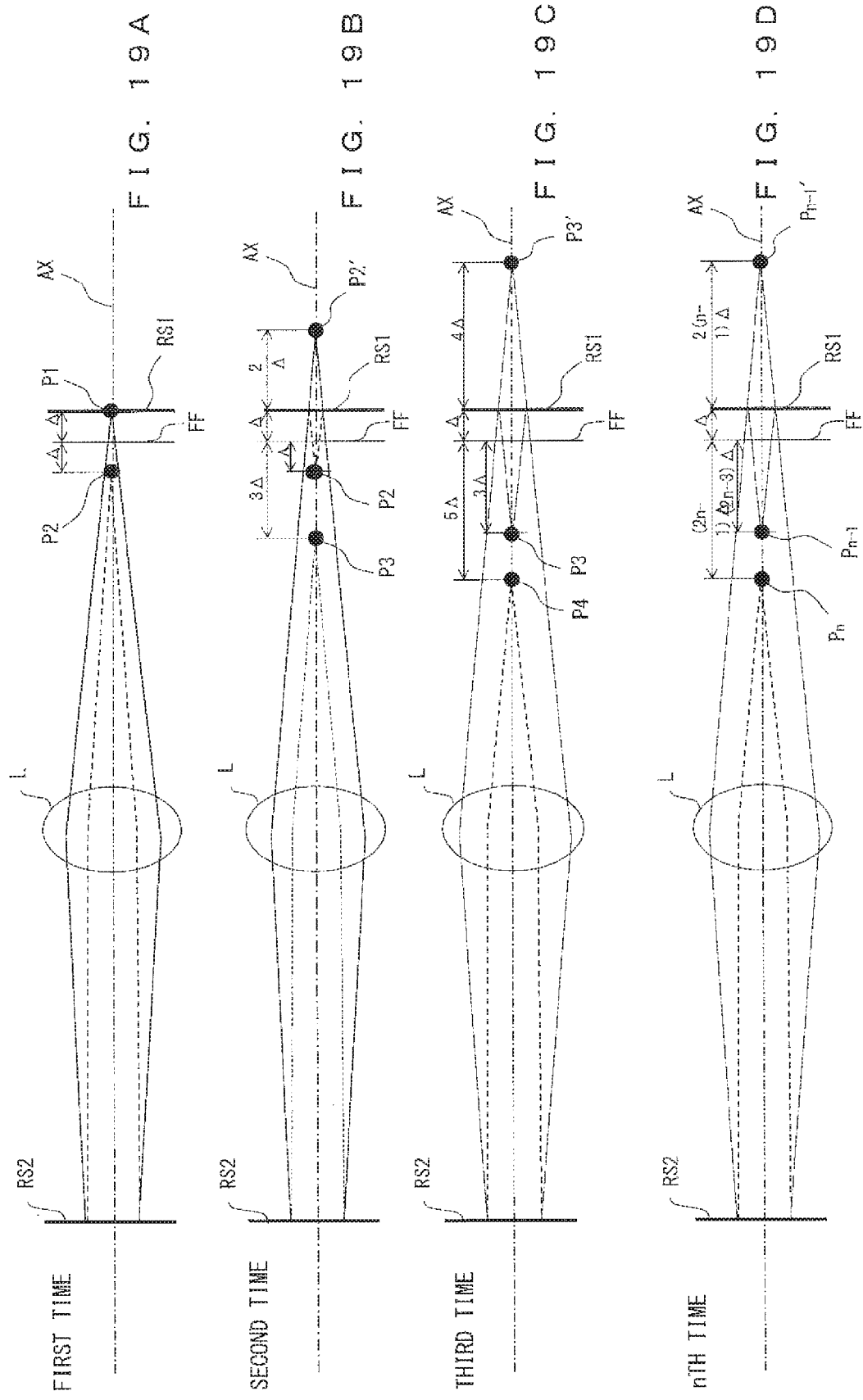
FIGS. 19A to 19D illustrate positional relationships between a front focal plane of a 4f optical system and a light source image position.

As illustrated in FIG. 19A, in the 4f optical system whose magnification (a lateral magnification and an axial magnification) is 1×, a beam of light from the position P1 that is farther away than the front focal plane FF from the 4f optical system by $\Delta$ in an optical axis direction is collected by the 4f optical system on the position P2 that is closer than the front focal plane FF to the 4f optical system by $\Delta$ in the optical axis direction. In other words, a light source image is projected by the 4f optical system onto the position P2 that is closer than the position P1 to the 4f optical system by 2$\Delta$.

When a reflection surface RS1 is arranged in the position P1 that is an initial entering position of a laser beam, as illustrated in FIG. 19B, a beam of light from a light source image formed in the position P2 that is closer than the position P1 to the 4f optical system by 2$\Delta$ is equivalent to a beam of light from a light source image formed in the position P2' that is farther away than the position P1 from the 4f optical system by 2$\Delta$. The reason is that the optical path length from the position P2 to the reflection surface RS1 is equal to the optical path length from the position P2' to the reflection surface RS1. Thus, a beam of light from the position P2 can be considered a beam of light from the position P2' that is farther away than the front focal plane FF from the 4f optical system by 3$\Delta$ in the optical axis direction. Therefore, the beam of light from the position P2 is collected by the 4f optical system on a position P3 that is closer than the front focal plane FF to the 4f optical system by 3$\Delta$ in the optical axis direction.

Likewise, as illustrated in FIG. 19C, a beam of light from the position P3 can be considered a beam of light from a position P3' that is farther away than the front focal plane FF from the 4f optical system by 5$\Delta$ in the optical axis direction. Thus, the beam of light from the position P3 is collected by the 4f optical system on a position P4 that is closer than the front focal plane FF to the 4f optical system by 5$\Delta$ in the optical axis direction.

In other words, a light source image formed in the position P1 that is farther away than the front focal plane FF from the 4f optical system by $\Delta$ in the optical axis direction is projected onto a position closer to the 4f optical system every time the beam of light reflected on the reflection surface RS2 is recycled. In particular, under the above condition, when the number of recycles is n, a light source image formed by an nth recycle is in a position $P_{n+1}$ that is closer than the front focal plane FF to the 4f optical system by $(2n-1)\Delta$ in the optical axis direction, as illustrated in FIG. 19D.

The reflection member 47 is similar to the reflection member 37 in being a reflector (a first reflector) including two flat mirrors (a reflection surface 47a and a reflection surface 47b). Further, the reflection member 47 is similar to the reflection member 37 in that the two reflection surfaces (the reflection surface 47a and the reflection surface 47b) each have a normal line, the respective normal lines being perpendicular to each other, and that each of the normal lines of the two reflection surfaces forms a 45-degree angle with the optical axis AX. Furthermore, the reflection member 47 is similar to the reflection member 37 in that two planes defined by those two reflection surfaces intersect with each other in the position P1 that is an initial entering position of a laser beam. However, the reflection member 47 is different from the reflection member 37 in that the two planes do not intersect with each other on the front focal plane FF of the illumination lens 33, but intersect with each other in a position farther away than the front focal plane FF from the illumination lens 33 because the position P1 is located farther away than the front focal plane FF from the illumination lens 33.

Moreover, the reflection member 47 is arranged so that a light source image is formed in a position from which a distance to the reflection member 47 in the optical axis AX direction is not greater than a predetermined distance. More specifically, the reflection member 47 is preferably arranged so that $\Delta$=D1 is satisfied. In this case, $\Delta$ is a distance between the initial entering position of a laser beam P1 (that is, a line of intersection of the two planes defined by the two reflection surfaces) and the front focal plane FF. D1 is a distance between the initial entering position of a laser beam P1 and the optical axis AX, and 2×D1 corresponds to the shift amount of a beam of light directed from the illumination lens 33 to the position P2 with respect to a beam of light directed from the initial entering position P1 to the illumination lens 33. If this condition ($\Delta$=D1) is satisfied, a light source image will be formed on the reflection surface 47b (the position P2, the position P3, the position P4), as illustrated in FIG. 18. As a result, a beam diameter in the reflection surface 47b becomes minimum, which results in suppressing the occurrence of vignetting in the reflection member 47.

Figure 20:
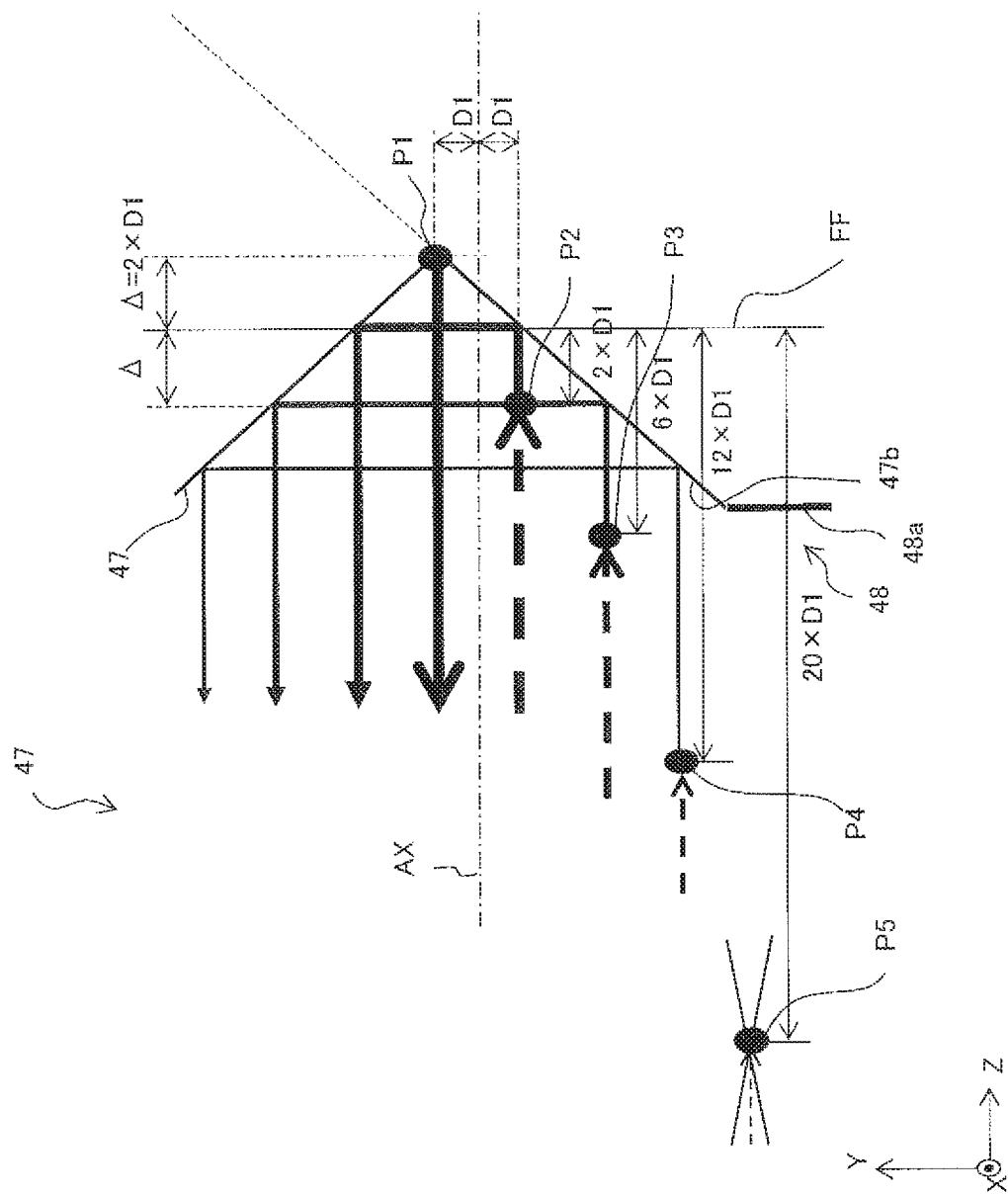
FIG. 20 illustrates an example of a modified positional relationship between a front focal position FF and the initial entering position illustrated in FIG. 18.

As long as a light source image is formed in a position from which a distance to the reflection member 47 in the optical axis direction is not greater than the predetermined distance, a relationship between $\Delta$ and D1 is not restricted to 4=D1. FIG. 20 illustrates an example of the reflection member 47 that is arranged so that $\Delta$=2×D1 is satisfied. If FIG. 5 ($\Delta$=0), FIG. 18 ($\Delta$=D1), and FIG. 20 ($\Delta$=2×D1) are compared with one another, the following relationships (1) and (2) are led between the position P2 that is a position of a light source image formed by a first recycle and the reflection surface. Thus, the reflection member 47 may be arranged so that 0<$\Delta$<2×D1 is satisfied, so as to suppress the occurrence of vignetting in the reflection member 47 at least upon the first recycle.

(1) When 0≤Δ≤D1, the position P2 is closer to the reflection surface if Δ is closer to D1.
(2) When D1≤Δ, the position P2 is farther away from the reflection surface if Δ is larger, and when Δ=2×D1, the distance between the position P2 and the reflection surface is equal to the distance when Δ=0.

The reflection member 48 is a second reflector that directs, toward the illumination lens 33, the beam of light reflected on the spinning disk 34 and entering through the illumination lens 33. The reflection member 48 is similar to the reflection member 40 of the disk scanning apparatus according to the second embodiment in having a reflection surface (a reflection surface 48*a*) perpendicular to the optical axis AX, and in being arranged in a position which a laser beam deviated from the reflection member 47 as a result of re-entering the spinning disk 34 repeatedly enters. The position is farther away than the reflection member 47 from the optical axis AX. However, there is a difference in that the reflection member 48 is arranged in a position closer than the front focal plane FF to the illumination lens 33, the position is near the reflection member 47. More specifically, it is arranged so as to be in contact with an edge of the reflection member 47 (the reflection surface 47*b*), the edge is closer to the illumination lens 33. Accordingly, as illustrated in FIG. 18, a distance between the reflection member 48 and a light source image (a position P5) becomes short, and a beam diameter in the reflection surface 48*a* is decreased, which permits suppressing of the occurrence of vignetting in the reflection member 48.

Thus, the disk scanning apparatus according to the present embodiment permits suppressing of the occurrence of vignetting in the reflection member 47 and the reflection member 48, which results in realizing an illumination efficiency higher than that in the disk scanning apparatus according to the second embodiment. Further, it is also similar to the disk scanning apparatus according to the second embodiment in permitting a mitigation of a bias in the illumination intensity distribution in the exit pupil plane of the objective 10.

Twelfth Embodiment

Figure 21:
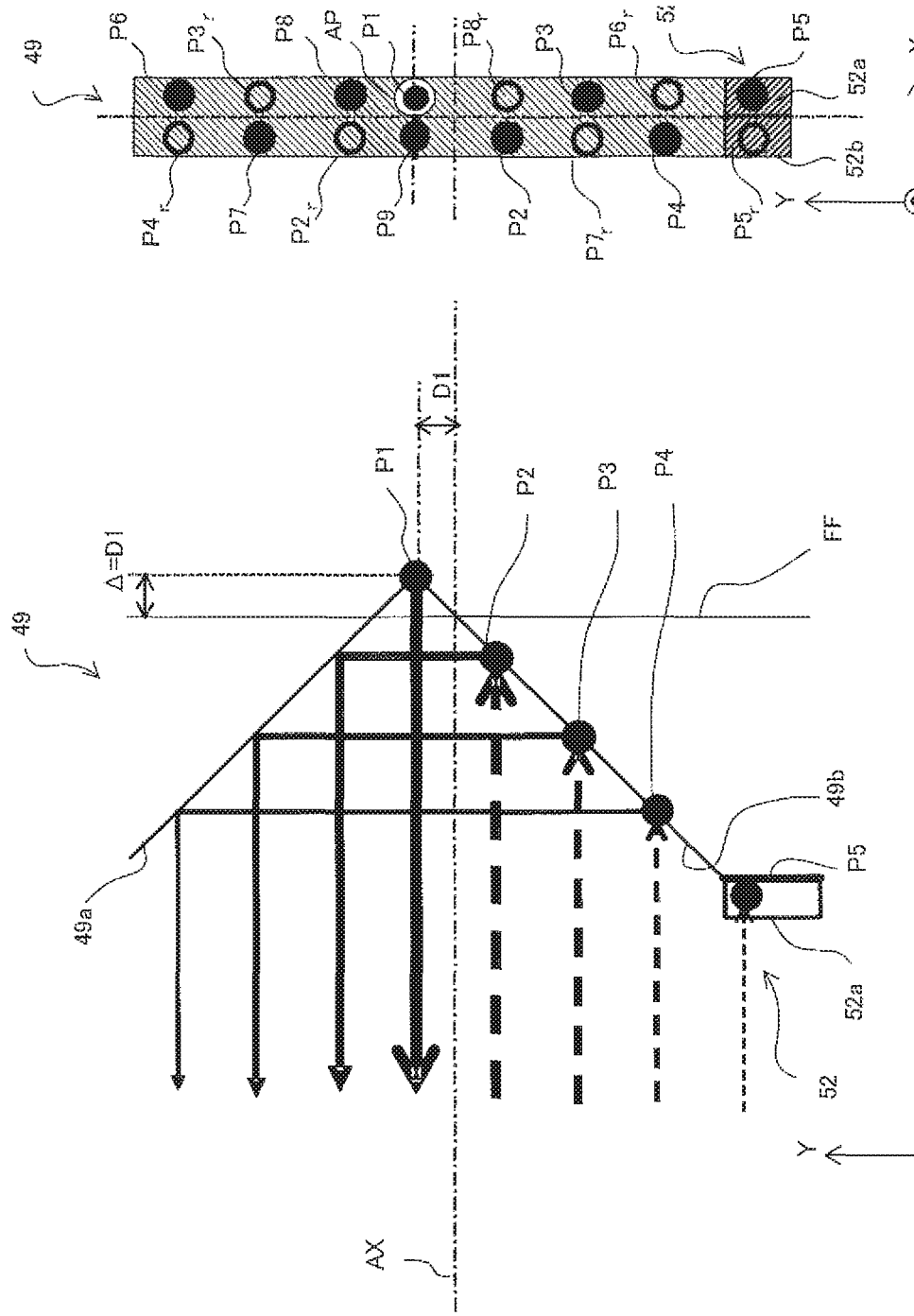
FIGS. 21A and 21B illustrate an example of a portion of a configuration of a disk scanning apparatus according to a twelfth embodiment of the present invention.

FIGS. 21A and 21B illustrate an example of a portion of a configuration of a disk scanning apparatus according to the present embodiment. FIG. 21A is the YZ-sectional view, and FIG. 21B illustrates the portion as viewed from the Z-axis direction. The disk scanning apparatus according to the present embodiment is different from the disk scanning apparatus according to the eleventh embodiment in arranging the exit end of the optical fiber 31*a* in a position offset from the optical axis AX not only in the Y-axis direction and in the Z-axis direction but also in the X-axis direction (a position P1), in including a reflection member 49 instead of the reflection member 47, and in including a reflection member 52 instead of the reflection member 48. The others in the configuration are similar to those of the disk scanning apparatus according to the eleventh embodiment.

The reflection member 49 is a reflector (a first reflector) including two flat mirrors (a reflection surface 49*a* and a reflection surface 49*b*). However, as illustrated in FIG. 21B, the reflection member 49 is different from the reflection member 47 in that an aperture AP is formed in a position offset from the optical axis AX in all directions of the three axes (X, Y, and Z axes). If an initial entering position (the position P1) is arranged in a position offset from the optical axis AX in all the three-axis directions so as to be aligned with the aperture AP formed in the reflection member 49, a position in which a light source image is formed by the illumination lens 33 (a position P2 to a position P9) varies in all the three-axis directions. This permits a use of a smaller flat mirror because a shift amount is shared in the three-axis directions. The positions P2*r* to P8*r* illustrated in FIG. 21B represent positions on which divergent beams from the light source images formed in the position P2 to the position P8 are reflected.

The reflection member 52 is a second reflector that directs, toward the illumination lens 33, the beam of light reflected on the spinning disk 34 and entering through the illumination lens 33. The reflection member 52 is different from the reflection member 48 in having two reflection surfaces (a reflection surface 52*a* and a reflection surface 52*b*) that each have a normal line, the respective normal lines being perpendicular to each other. The reflection member 52 is arranged so that a plane (an XZ plane) that includes the normal lines of the two reflection surfaces of the reflection member 52 is perpendicular to a plane (a YZ plane) that includes the normal lines of the two reflection surfaces of the reflection member 49.

The beam of light entering the reflection member 52 is converted into a beam of light that has an inverted travelling direction and has been shifted in the X-direction. This permits a further increase in the number of recycles because it is possible to prevent the beam of light reflected on the reflection member 52 from entering the aperture AP.

Thus, the disk scanning apparatus according to the present embodiment permits a realization of an illumination efficiency higher than that in the disk scanning apparatus according to the eleventh embodiment. Further, a reflection member can be made smaller.

Thirteenth Embodiment

Figure 22:
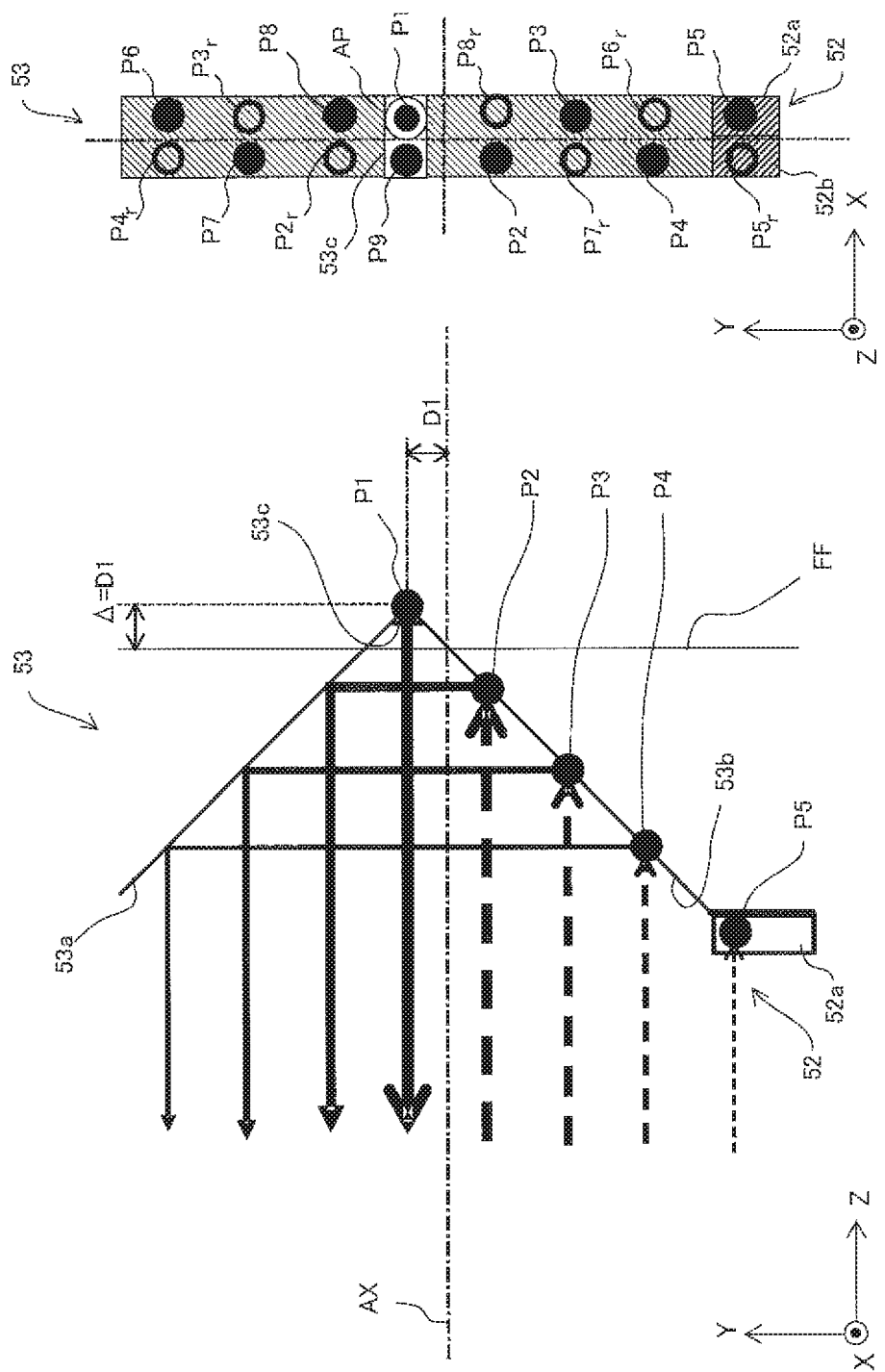
FIGS. 22A and 22B illustrate an example of a portion of a configuration of a disk scanning apparatus according to a thirteenth embodiment of the present invention.

FIGS. 22A and 22B illustrate an example of a portion of a configuration of a disk scanning apparatus according to the present embodiment. FIG. 22A is the YZ-sectional view, and FIG. 22B illustrates the portion as viewed from the Z-axis direction. The disk scanning apparatus according to the present embodiment is different from the disk scanning apparatus according to the twelfth embodiment in including a reflection member 53 instead of the reflection member 49. The others in the configuration are similar to those of the disk scanning apparatus according to the twelfth embodiment.

The reflection member 53 is a reflector (a first reflector) including two flat mirrors (a reflection surface 53*a* and a reflection surface 53*b*) that are inclined with respect to the optical axis AX and a flat mirror (a reflection surface 53*c*) that connects the two flat mirrors and is perpendicular to the optical axis AX. As illustrated in FIG. 22B, the reflection member 53 is similar to the reflection member 49 in that the aperture AP is formed in a position offset from the optical axis AX in all directions of the three axes (X, Y, and Z axes). However, the reflection member 53 is different from the reflection member 49 in that the aperture AP is formed in the reflection surface 53*c* perpendicular to the optical axis AX.

As is the case in the disk scanning apparatus according to the twelfth embodiment, the beam of light reflected on the reflection member 52 is repeatedly recycled and enters a position P9 shifted from the aperture AP in the X-direction. The position P9 is provided with the reflection surface 53*c* perpendicular to the optical axis AX, so it is possible to invert the travelling direction of the beam of light entering the position P9.

The disk scanning apparatus according to the present embodiment, too, permits a realization of an illumination efficiency higher than that in the disk scanning apparatus according to the eleventh embodiment. Further, it is also similar in making a reflection member smaller.

Fourteenth Embodiment

FIG. 23 illustrates an example of a configuration of a confocal microscope 300 according to the present embodiment. The confocal microscope 300 according to the present embodiment is a confocal observation apparatus that includes a scanning apparatus 70, and is a fluorescence microscope that detects a fluorescence from the sample S to obtain an image of the sample S. The confocal microscope 300 is different from the confocal microscope 100 in including the scanning apparatus 70 instead of the disk scanning apparatus 30.

The scanning apparatus 70 is different from the disk scanning apparatus 30 in including the reflection member 47 and the reflection member 48 that are included in the disk scanning apparatus according to the eleventh embodiment instead of the reflection member 37, and in including a prism 71 and a spatial light modulator 72 instead of the spinning disk 34.

The spatial light modulator 72 is a MEMS (micro electro mechanical systems) device including a plurality of micromirrors that are independently controllable, and is a digital mirror device (DMD). The DMD 72 modulates an incident beam of light using the plurality of micromirrors (a reflection surface 72a). More specifically, the spatial light modulator 72 controls a reflection direction of light entering each of the micromirrors, in two directions, in an ON direction and in an OFF direction, by controlling an inclined direction of each of the micromirrors. Each of the plurality of micromirrors is a flat mirror, and is a first reflection surface of the scanning apparatus 70.

The spatial light modulator 72 is arranged in a plane optically conjugate with the front focal plane of the objective 10. The conjugate plane is in or in the proximity of the back focal plane of the illumination lens 33. More specifically, the spatial light modulator 72 is arranged so that light reflected in the ON direction is directed toward the tube lens 20 through the prism 71 and light reflected in the OFF direction re-enters the illumination lens 33 through the prism 71.

In the confocal microscope 300, the spatial light modulator 72 functions like the spinning disk 34 according to the first embodiment, and a recycling optical system is constituted. Thus, like the confocal microscope 100 according to the first embodiment, the confocal microscope 300, too, permits a realization of a high illumination efficiency.

Fifteenth Embodiment

Figure 24:
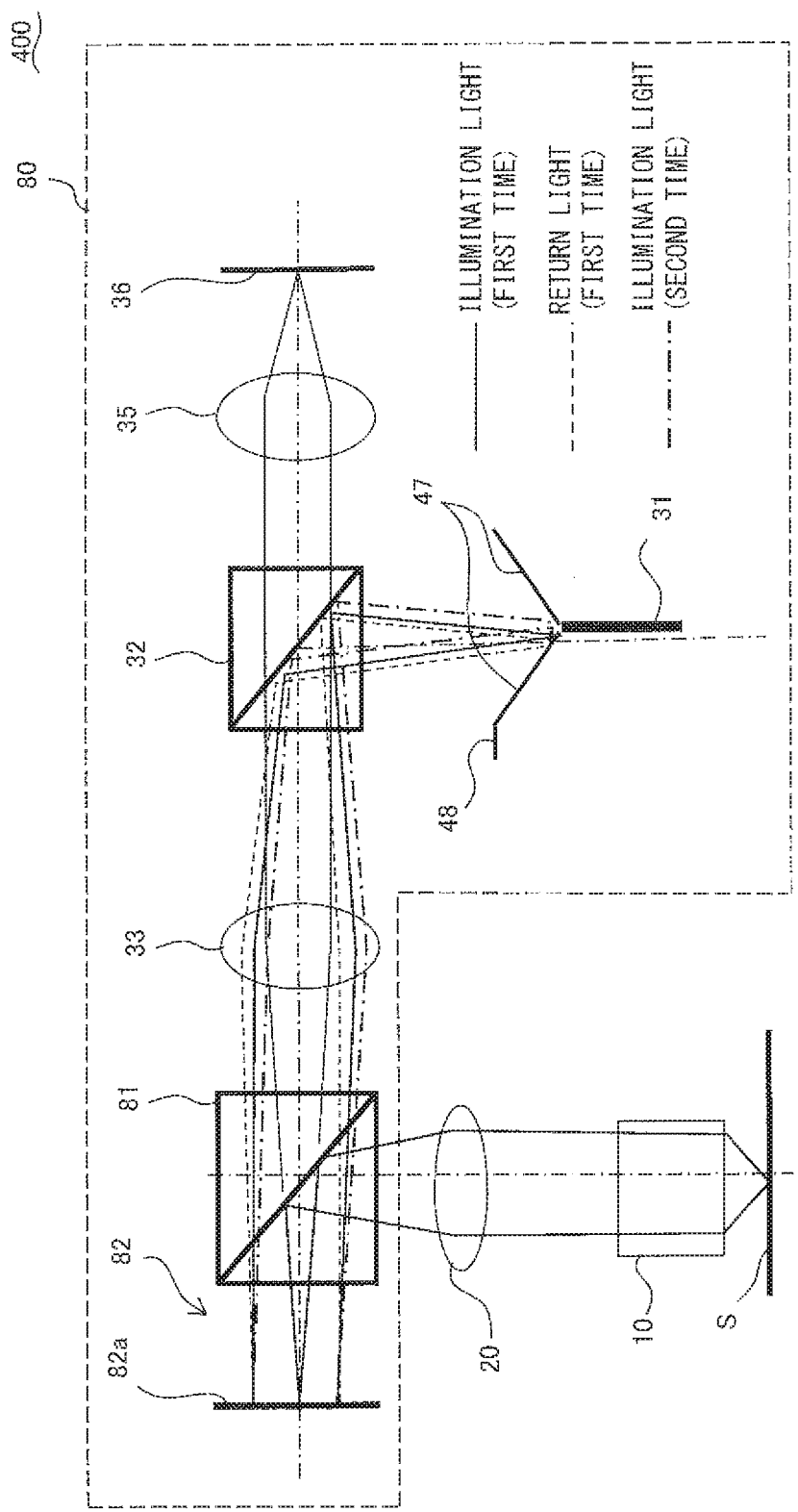
FIG. 24 illustrates an example of a configuration of a confocal microscope according to a fifteenth embodiment of the present invention.

FIG. 24 illustrates an example of a configuration of a confocal microscope 400 according to the present embodiment. The confocal microscope 400 according to the present embodiment is a confocal observation apparatus that includes a scanning apparatus 80, and is a fluorescence microscope that detects a fluorescence from the sample S to obtain an image of the sample S. The confocal microscope 400 is different from the confocal microscope 100 in including the scanning apparatus 80 instead of the disk scanning apparatus 30.

The scanning apparatus 80 is different from the disk scanning apparatus 30 in including the reflection member 47 and the reflection member 48 that are included in the disk scanning apparatus according to the eleventh embodiment instead of the reflection member 37, and in including a polarization beam splitter (PBS) 81 and a spatial light modulator 82 instead of the spinning disk 34.

The spatial light modulator 82 is a liquid crystal device including a plurality of pixel elements that are independently controllable, and is, for example, an LOCS (liquid crystal on silicon). The spatial light modulator 82 modulates a polarization direction of an incident beam of light using the plurality of pixel elements each having a reflection surface 82a. More specifically, the spatial light modulator 82 controls balance between light to be led by the PBS 81 to the tube lens 20 and light to be led by the PBS 81 to the illumination lens 33. In other words, the PBS 81 and the spatial light modulator 82 control, in two directions, a reflection direction of light entering each of the reflection surfaces 82a. Each of the reflection surfaces 82a is a flat mirror, and is a first reflection surface of the scanning apparatus 80.

The spatial light modulator 82 is arranged in a plane conjugate with the front focal plane of the objective 10. The conjugate plane is in or in the proximity of the back focal plane of the illumination lens 33.

In the confocal microscope 400, the spatial light modulator 82 functions like the spinning disk 34 according to the first embodiment, and a recycling optical system is constituted. Thus, like the confocal microscope 100 according to the first embodiment, the confocal microscope 400, too, permits a realization of a high illumination efficiency.

The embodiments described above are just examples to facilitate understanding of the present invention, and the invention is not limited to these embodiments. Various modifications and alterations may be made to a scanning apparatus, a confocal observation apparatus, and a disk scanning apparatus without departing from the invention specified in the claims. A combination of some of the features in the embodiments described herein may be provided as a single embodiment.

Figure 25A:
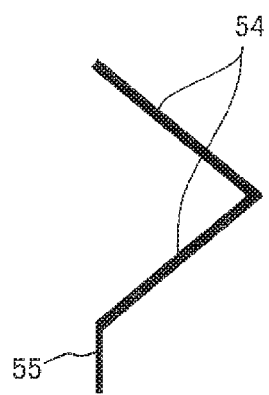
FIGS. 25A to 25C illustrate examples of configurations of reflectors.
Figure 25B:
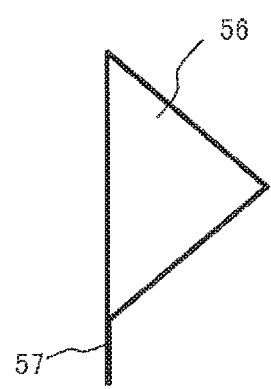
Figure 25C:
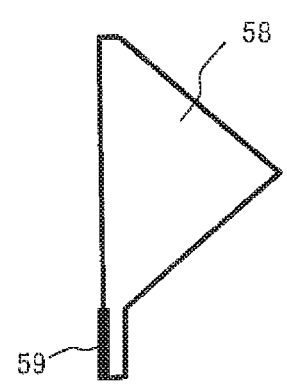

For example, the configuration of the reflector according to each of the embodiments is not restricted to a configuration constituted of a recycling mirror 54 and a mirror 55 illustrated in FIG. 25A, and it may be a configuration constituted of a prism 56 and a mirror 57 illustrated in FIG. 25B. Further, it may be a configuration constituted of a prism 58 and a mirror coating 59 formed on the surface of the prism 58 illustrated in FIG. 25C.

The DMD is taken as an example in the fourteenth embodiment, and the LCOS is taken as an example in the fifteenth embodiment, but like the DMD and the LCOS, the spinning disks 34 included in the disk scanning apparatuses according to the first embodiment to the thirteenth embodiment, too, are spatial light modulators that modulate an incident light spatially. If these spatial light modulators are arranged in a position optically conjugate with a sample S (a front focal position of the objective 10), they serve as means for bringing a confocal effect as well as scanner. Further, the spatial light modulator according to the other embodiments excluding the spatial light modulator (LCOS) according to the fifteenth embodiment is intensity modulator that modulates a spatial intensity distribution of light and splits an incident light into light directed to a sample and light directed to an illumination lens. The spatial light modulator (LCOS) according to the fifteenth embodiment constitutes, along with the PBS arranged in front of it, intensity modulator that modulates a spatial intensity distribution of light and splits an incident light into light directed to a sample and light directed to an illumination lens.

What is claimed is:

1. A scanning apparatus comprising:
    a light source;
    a spatial light modulator configured to have a flat first reflection surface and to modulate an incident beam of light on the first reflection surface;
    an illumination lens configured to irradiate the spatial light modulator with a beam of light from the light source and to refract a principal ray of a beam of light modulated by the spatial light modulator so that an angle between the principal ray and an optical axis of the illumination lens decreases, the first reflection surface being located in a back focal plane of the illumination lens; and
    a first reflector that directs, toward the illumination lens, a beam of light by reflecting the beam of light multiple times between the illumination lens and a front focal plane of the illumination lens, the beam of light being modulated by the spatial light modulator and entering through the illumination lens,
    wherein:
    the illumination lens converts a beam of light reflected on the first reflection surface into a convergent beam, and
    the first reflector converts an incident beam of light into a divergent beam that has an inverted travelling direction and has been shifted in a direction perpendicular to the optical axis.

2. The scanning apparatus according to claim 1, wherein the illumination lens converts the beam of light from the light source into a beam of light inclined with respect to a normal line of the first reflection surface.

3. A scanning apparatus comprising:
    a light source;
    a spatial light modulator configured to have a flat first reflection surface and to modulate an incident beam of light on the first reflection surface;
    an illumination lens configured to irradiate the spatial light modulator with a beam of light from the light source and to refract a principal ray of a beam of light modulated by the spatial light modulator so that an angle between the principal ray and an optical axis of the illumination lens decreases; and
    a first reflector that directs, toward the illumination lens, a beam of light by reflecting the beam of light multiple times between the illumination lens and a front focal plane of the illumination lens, the beam of light being modulated by the spatial light modulator and entering through the illumination lens,
    wherein the illumination lens and the spatial light modulator are arranged so that a first image of the light source is formed, in a state in which the first reflector is excluded, by the illumination lens in a first position that is closer than the front focal plane of the illumination lens to the illumination lens.

4. The scanning apparatus according to claim 3, wherein the first reflector is arranged so that a second image of the light source is formed by the illumination lens in a position from which a distance to the first reflector in a direction of the optical axis of the illumination lens is not greater than a predetermined distance.

5. The scanning apparatus according to claim 3, wherein:
    the first reflector has two second reflection surfaces that reflect a beam of light entering through the illumination lens and that each have a normal line, the respective normal lines being perpendicular to each other,
    two planes defined by the two second reflection surfaces intersect with each other in a position farther away than the front focal plane from the illumination lens, and
    when $\Delta$ represents a distance between a line of intersection of the two planes defined by the two second reflection surfaces and the front focal plane of the illumination lens, and $2 \times D1$ represents an amount of shift of a beam of light directed from the illumination lens to the first position with respect to a beam of light directed from the light source to the illumination lens and in a direction perpendicular to the optical axis, the following conditional expression is satisfied: $0 < \Delta < 2 \times D1$.

6. The scanning apparatus according to claim 1, wherein the illumination lens and the spatial light modulator are arranged so that a first image of the light source is formed, in a state in which the first reflector is excluded, by the illumination lens in the front focal plane of the illumination lens or in the proximity of the front focal plane.

7. The scanning apparatus according to claim 6, wherein the first reflector is arranged so that a second image of the light source is formed by the illumination lens in a position that is optically equivalent to the front focal plane or the proximity of the front focal plane.

8. The scanning apparatus according to claim 7, wherein:
    the first reflector has two second reflection surfaces that reflect a beam of light entering through the illumination lens and that each have a normal line, the respective normal lines being perpendicular to each other, and
    two planes defined by the two second reflection surfaces intersect with each other in the front focal plane of the illumination lens or in the proximity of the front focal plane.

9. The scanning apparatus according to claim 1, wherein the spatial light modulator is arranged in the back focal plane of the illumination lens or in the proximity of the back focal plane.

10. The scanning apparatus according to claim 1, further comprising a second reflector configured to direct, toward the illumination lens, the beam of light modulated by the spatial light modulator and entering through the illumination lens.

11. The scanning apparatus according to claim 10, wherein the second reflector is arranged in a position farther away than the first reflector from the optical axis, the position being near the first reflector.

12. The scanning apparatus according to claim 11, wherein the second reflector has a third reflection surface perpendicular to the optical axis.

13. The scanning apparatus according to claim 11, wherein the second reflector has two third reflection surfaces each having a normal line, the respective normal lines being perpendicular to each other.

14. A confocal observation apparatus comprising:
    the scanning apparatus according to claim 1; and
    an objective,
    wherein the scanning apparatus includes the first reflection surface in a plane optically conjugate with a front focal plane of the objective.

15. The confocal observation apparatus according to claim 14, further comprising a tube lens between the objective and the scanning apparatus,
    wherein the tube lens and the illumination lens of the scanning apparatus are configured so that the front focal plane of the illumination lens is projected onto a back focal plane of the objective at a projection magnification not greater than 1×.

16. A disk scanning apparatus comprising:
a light source;
a disk configured to have a flat first reflection surface, apertures being formed in the disk;
an illumination lens configured to irradiate the disk with a beam of light from the light source and to refract a principal ray of a beam of light reflected on the first reflection surface of the disk so that an angle between the principal ray and an optical axis of the illumination lens decreases; and
a first reflector that directs, toward the illumination lens, a beam of light by reflecting the beam of light multiple times between the illumination lens and a front focal plane of the illumination lens, the beam of light being reflected on the disk and entering through the illumination lens;
wherein the illumination lens and the disk are arranged so that a first image of the light source is formed, in a state in which the first reflector is excluded, in the front focal plane of the illumination lens.

\* \* \* \* \*